(12) United States Patent
Hallowell et al.

(10) Patent No.: US 10,817,817 B2
(45) Date of Patent: *Oct. 27, 2020

(54) WHOLESALE VIRTUAL INVENTORY AND RETAIL LEAD GENERATION

(71) Applicant: Openlane, Inc., Redwood City, CA (US)

(72) Inventors: Zachary E. Hallowell, Falmouth, ME (US); Andrew Iorgulescu, San Francisco, CA (US)

(73) Assignee: Openlane, Inc., Redwood City, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/124,414

(22) Filed: Sep. 7, 2018

(65) Prior Publication Data

US 2019/0073621 A1 Mar. 7, 2019

Related U.S. Application Data

(63) Continuation of application No. 14/679,474, filed on Apr. 6, 2015, now Pat. No. 10,074,061, which is a (Continued)

(51) Int. Cl.
*G06Q 30/00* (2012.01)
*G06Q 10/06* (2012.01)
(Continued)

(52) U.S. Cl.
CPC ... *G06Q 10/06315* (2013.01); *G06Q 30/0214* (2013.01); *G06Q 30/06* (2013.01); *G06Q 30/0601* (2013.01)

(58) Field of Classification Search
CPC .................................................. G06Q 30/06–08
(Continued)

(56) References Cited

U.S. PATENT DOCUMENTS

| 4,774,664 A | 9/1988 | Campbell et al. |
| 5,764,628 A | 6/1998 | Davis et al. |

(Continued)

FOREIGN PATENT DOCUMENTS

| WO | WO2007009003 A3 | 4/2007 |
| WO | WO2010099533 A1 | 9/2010 |
| WO | WO2010099533 A9 | 3/2011 |

OTHER PUBLICATIONS

AutoTradeCenter, 2004: http://web.archive.org/web/20050125180848/http://autotradecenter.com.
(Continued)

*Primary Examiner* — Ethan D Civan
(74) *Attorney, Agent, or Firm* — Lempia Summerfield Katz LLC

(57) ABSTRACT

Embodiments are described herein including systems and methods for presenting vehicles available for wholesale purchase to retail consumers in order to generate a retail "lead" on a specific vehicle prior to acquisition of that vehicle by a dealer. The electronic lead, once generated, is made available to a licensed dealer before the dealer acquires the inventory corresponding to the lead. In contrast to known lead generation models, the lead is created on a specific vehicle that a retail dealer has the ability to purchase, but has not yet taken into inventory.

26 Claims, 17 Drawing Sheets

Related U.S. Application Data continuation of application No. 12/714,960, filed on Mar. 1, 2010, now abandoned.

(60) Provisional application No. 61/156,153, filed on Feb. 27, 2009.

(51) Int. Cl.
  *G06Q 30/02* (2012.01)
  *G06Q 30/06* (2012.01)
(58) Field of Classification Search
  USPC .............................................. 705/26.1–27, 2
  See application file for complete search history.

(56) References Cited

U.S. PATENT DOCUMENTS

| | | |
|---|---|---|
| 5,774,873 A | 6/1998 | Berent et al. |
| 5,794,219 A | 8/1998 | Brown |
| 5,812,070 A | 9/1998 | Tagami et al. |
| 5,818,914 A | 10/1998 | Fujisaki |
| 5,835,236 A | 11/1998 | Barbari |
| 5,835,896 A | 11/1998 | Fisher et al. |
| 5,856,931 A | 1/1999 | McCasland |
| 5,857,159 A | 1/1999 | Dickrell et al. |
| 5,890,138 A | 3/1999 | Godin et al. |
| 5,905,974 A | 5/1999 | Fraser et al. |
| 5,905,975 A | 5/1999 | Ausubel |
| 5,915,209 A | 6/1999 | Lawrence |
| 5,966,699 A | 10/1999 | Zandi |
| 5,978,776 A | 11/1999 | Seretti et al. |
| 6,006,148 A | 12/1999 | Strong |
| 6,006,201 A | 12/1999 | Berent et al. |
| 6,012,045 A | 1/2000 | Barzilai et al. |
| 6,021,398 A | 2/2000 | Ausubel |
| 6,023,685 A | 2/2000 | Brett et al. |
| 6,023,687 A | 2/2000 | Weatherly et al. |
| 6,026,163 A | 2/2000 | Micali |
| 6,038,597 A | 3/2000 | Van Wyngarden |
| 6,041,310 A | 3/2000 | Green et al. |
| 6,049,784 A | 4/2000 | Weatherly et al. |
| 6,055,518 A | 4/2000 | Franklin et al. |
| 6,061,789 A | 5/2000 | Hauser et al. |
| 6,151,589 A | 11/2000 | Aggarwal et al. |
| 6,161,099 A | 12/2000 | Harrington et al. |
| 6,167,384 A | 12/2000 | Graff |
| 6,202,051 B1 | 3/2001 | Woolston |
| 6,243,691 B1 | 6/2001 | Fisher et al. |
| 6,266,652 B1 | 7/2001 | Godin et al. |
| 6,269,395 B1 | 7/2001 | Blatherwick et al. |
| 6,292,788 B1 | 9/2001 | Roberts et al. |
| 6,298,333 B1 | 10/2001 | Manzi et al. |
| 6,347,302 B1 | 2/2002 | Joao |
| 6,381,587 B1 | 4/2002 | Guzelsu |
| 6,385,730 B2 | 5/2002 | Garrison |
| 6,397,337 B1 | 5/2002 | Garrett et al. |
| 6,397,356 B1 | 5/2002 | Yonezawa |
| 6,430,488 B1 | 8/2002 | Goldman et al. |
| 6,449,601 B1 | 9/2002 | Friedland et al. |
| 6,470,324 B1 | 10/2002 | Brown et al. |
| 6,480,854 B1 | 11/2002 | Gross et al. |
| 6,502,080 B1 | 12/2002 | Eichorst et al. |
| 6,529,952 B1 | 3/2003 | Blumenau |
| 6,539,482 B1 | 3/2003 | Blanco et al. |
| 6,560,580 B1 | 5/2003 | Fraser et al. |
| 6,606,608 B1 | 8/2003 | Bezos et al. |
| 6,609,108 B1 | 8/2003 | Pulliam et al. |
| 6,611,728 B1 | 8/2003 | Morioka et al. |
| 6,622,129 B1 | 9/2003 | Whitworth |
| 6,678,731 B1 | 1/2004 | Howard et al. |
| 6,694,365 B1 | 2/2004 | Wyngarden |
| 6,697,806 B1 | 2/2004 | Cook |
| 6,725,201 B2 | 4/2004 | Joao |
| 6,735,573 B1 | 5/2004 | Gelman et al. |
| 6,745,225 B2 | 6/2004 | Loh et al. |
| 6,751,546 B2 | 6/2004 | Yamashita |
| 6,754,564 B2 | 6/2004 | Newport |
| 6,768,935 B1 | 7/2004 | Morgan et al. |
| 6,785,658 B1 | 8/2004 | Merker et al. |
| 6,813,612 B1 | 11/2004 | Rabenold et al. |
| 6,819,218 B2 | 11/2004 | Mabuchi et al. |
| 6,865,566 B2 | 3/2005 | Serrano-Morales et al. |
| 6,868,389 B1 | 3/2005 | Wilkins et al. |
| 6,920,433 B1 | 7/2005 | Seretti et al. |
| 6,980,963 B1 | 12/2005 | Hanzek |
| 7,103,568 B1 | 9/2006 | Fusz et al. |
| 7,363,246 B1 | 4/2008 | Van Horn et al. |
| 7,409,361 B2 | 8/2008 | Dinwoodie |
| 7,426,481 B1 | 9/2008 | Connors |
| 7,430,517 B1 | 9/2008 | Barton |
| 7,480,550 B2 | 1/2009 | Huber et al. |
| 7,908,180 B2 | 3/2011 | Goclowski |
| 7,921,052 B2 | 4/2011 | Dabney et al. |
| 2001/0044751 A1 | 11/2001 | Pugliese, III et al. |
| 2001/0056396 A1 | 12/2001 | Goino |
| 2002/0002475 A1 | 1/2002 | Freedman et al. |
| 2002/0023537 A1 | 2/2002 | Ridgeway et al. |
| 2002/0049663 A1 | 4/2002 | Kahana |
| 2002/0082978 A1 | 6/2002 | Ghouri et al. |
| 2002/0111877 A1 | 8/2002 | Nelson |
| 2002/0143646 A1 | 10/2002 | Boyden et al. |
| 2002/0186144 A1 | 12/2002 | Meunier |
| 2003/0004806 A1 | 1/2003 | Vaitekunas |
| 2003/0120509 A1 | 6/2003 | Bruch et al. |
| 2003/0130952 A1 | 7/2003 | Bell et al. |
| 2003/0158806 A1 | 8/2003 | Hanley et al. |
| 2004/0107160 A1 | 6/2004 | Goclowski |
| 2004/0117293 A1 | 6/2004 | Lammle et al. |
| 2004/0128224 A1 | 7/2004 | Dabney et al. |
| 2004/0172266 A1 | 9/2004 | Sheinson et al. |
| 2005/0021444 A1 | 1/2005 | Bauer et al. |
| 2005/0038758 A1 | 2/2005 | Hilbush et al. |
| 2005/0065853 A1 | 3/2005 | Ferreira |
| 2005/0080712 A1 | 4/2005 | Bauer et al. |
| 2005/0125330 A1 | 6/2005 | Dinwoodie |
| 2005/0228736 A1 | 10/2005 | Norman et al. |
| 2005/0256780 A1 | 11/2005 | Eldred |
| 2006/0074790 A1 | 4/2006 | Anspach |
| 2006/0206408 A1 | 9/2006 | Nassiri |
| 2006/0265235 A1 | 11/2006 | Schuchardt et al. |
| 2007/0179860 A1 | 8/2007 | Romero |
| 2007/0226081 A1* | 9/2007 | Vilcauskas ......... G06Q 30/0603 705/26.41 |
| 2008/0300962 A1 | 12/2008 | Cawston et al. |
| 2009/0048942 A1* | 2/2009 | Bouwens ........... G06Q 30/0603 705/26.35 |
| 2010/0223106 A1 | 9/2010 | Hallowell et al. |
| 2015/0213386 A1 | 7/2015 | Hallowell et al. |

OTHER PUBLICATIONS

Canadian Office Action dated Apr. 18, 2017, for Canadian Patent Application No. 2,753,889.
Canadian Office Action dated Jun. 3, 2016, for Canadian Patent Application No. 2,753,889.
Canadian Office Action for Canadian Application serial No. 2,753,889, dated Mar. 22, 2018.
Collins English Dictionary, Harper Collins Publishing 2000.
Form PCT/IB/373, PCT/US06/27088, "PCT International Preliminary Report on Patentability."
Form PCT/ISA/210, PCT/US06/27088, "PCT International Search Report".
Form PCT/ISA/210, PCT/US10/25759, "PCT International Search Report."
Form PCT/ISA/220, PCT/US06/27088, PCT Notification of "Transmittal of the International Search Report and the Written Opinion of the International Searching Authority, or the Declaration."
Form PCT/ISA/220, PCT/US10/25759, "PCT Notification of Transmittal of the International Search Report and the Written Opinion of the International Searching Authority, or the Declaration."
Form PCT/ISA/237, PCT/US06/27088, "PCT Written Opinion of the International Searching Authority."

(56) References Cited

OTHER PUBLICATIONS

Form PCT/ISA/237, PCT/US10/25759, "PCT Written Opinion of the International Searching Authority."
PCT/US10/37797; PCT/ISA/210 "International Search Report."
PCT/US10/37797; PCT/ISA/220 "Notification of Transmittal of the International Search Report and the Written Opinion of the International Searching Authority, or the Declaration."
PCT/US10/37797; PCT/ISA/237 "Written Opinion of the International Searching Authority."
UPS Domestic Delivery Area Surcharge: http://web.archive.org/web/20050404012352/www.ups.com/contents/us/en/ship-ping/cost/zones/on_demand.html dated Apr. 4, 2005; Domestic Delivery Area Surcharge Chart (dated Jan. 3, 2005 [retrieved from Internet Archive on Dec. 14, 2009].
UPS Payment Methods: http://web.archive.org/web/20050519002823/www.ups.com/content/us/en/resou-rces/pay/methods.html (dated May 19, 2005) [retrieved from Internet Archive on Dec. 15, 2009].

\* cited by examiner

WHOLESALE VIRTUAL INVENTORY AND RETAIL LEAD GENERATION

RELATED APPLICATIONS

This application is a continuation of U.S. patent application Ser. No. 14/679,474 (now U.S. Pat. No. 10,074,061), which is a continuation of U.S. patent application Ser. No. 12/714,960 (abandoned), which claims the benefit of U.S. patent application Ser. No. 61/156,153, filed Feb. 27, 2009, each of which are incorporated by reference herein in their entirety.

This application is related to U.S. patent application Ser. No. 11/457,068, filed Jul. 12, 2006.

This application is related to U.S. patent application Ser. No. 11/457,074, filed Jul. 12, 2006.

This application is related to U.S. patent application Ser. No. 11/457,077, filed Jul. 12, 2006.

This application is related to U.S. patent application Ser. No. 11/681,727, filed Mar. 2, 2007.

This application is related to U.S. patent application Ser. No. 11/681,729, filed Mar. 2, 2007.

This application is related to U.S. patent application Ser. No. 11/685,120, filed Mar. 12, 2007.

This application is related to U.S. patent application Ser. No. 11/685,121, filed Mar. 12, 2007.

TECHNICAL FIELD

The embodiments described herein relate generally to a method and apparatus for identifying and selling wholesale items. More particularly, the embodiments described herein relate to a virtual inventory system that enables a retail consumer to identify items in a wholesale market, and enables a dealer to acquire the items for resale to the consumer in response to the consumer's interest.

BACKGROUND

In the traditional retail used vehicle sale model, a dealer acquires inventory based upon speculation of consumers' interest in their market. The process of determining consumer interest is very subjective and the dealer is only able to generate consumer interest on a specific vehicle after the dealer acquires it. The dealer may end up holding the vehicle inventory for an extended period of time, during which it is depreciating and will have to sell it for a loss.

This conventional retail model is one that imposes a significant degree of risk on the dealer, whereby a dealer acquires inventory based upon speculation of consumers' interest in their market. The process of determining consumer market interest is very subjective and the dealer is only able to generate consumer interest on a specific vehicle after the dealer acquires it. The dealer may end up holding the vehicle in inventory for an extended period of time, during which it is depreciating and may be incurring other significant expenses.

In other conventional cases, a dealer may acquire a vehicle based on the known interest of an existing customer. This minimizes risk, as the likelihood of a quick sale is substantially greater, however the dealer rarely, if ever, is able to tell the consumer the exact specifications of the vehicle they will purchase at the time the consumer expresses interest, leading to the potential of the consumer rejecting the car due to unmet expectations.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments are described herein including systems and methods for presenting vehicles available for wholesale purchase to retail consumers in order to generate a retail "lead" on a specific vehicle. The systems and methods comprising the embodiments described herein are referred to as the Wholesale Virtual Inventory and Retail Lead Generation System (WVIRLGS). The lead, once generated, is made available to a licensed dealer before the dealer has acquired the inventory that generated the lead. As opposed to all known lead generation models, the lead is created on a specific vehicle that a retail dealer has the ability to purchase, but has not yet purchased and does not have in the dealer inventory.

In the description herein, numerous specific details are introduced to provide a thorough understanding of, and enabling description for, embodiments of the WVIRLGS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
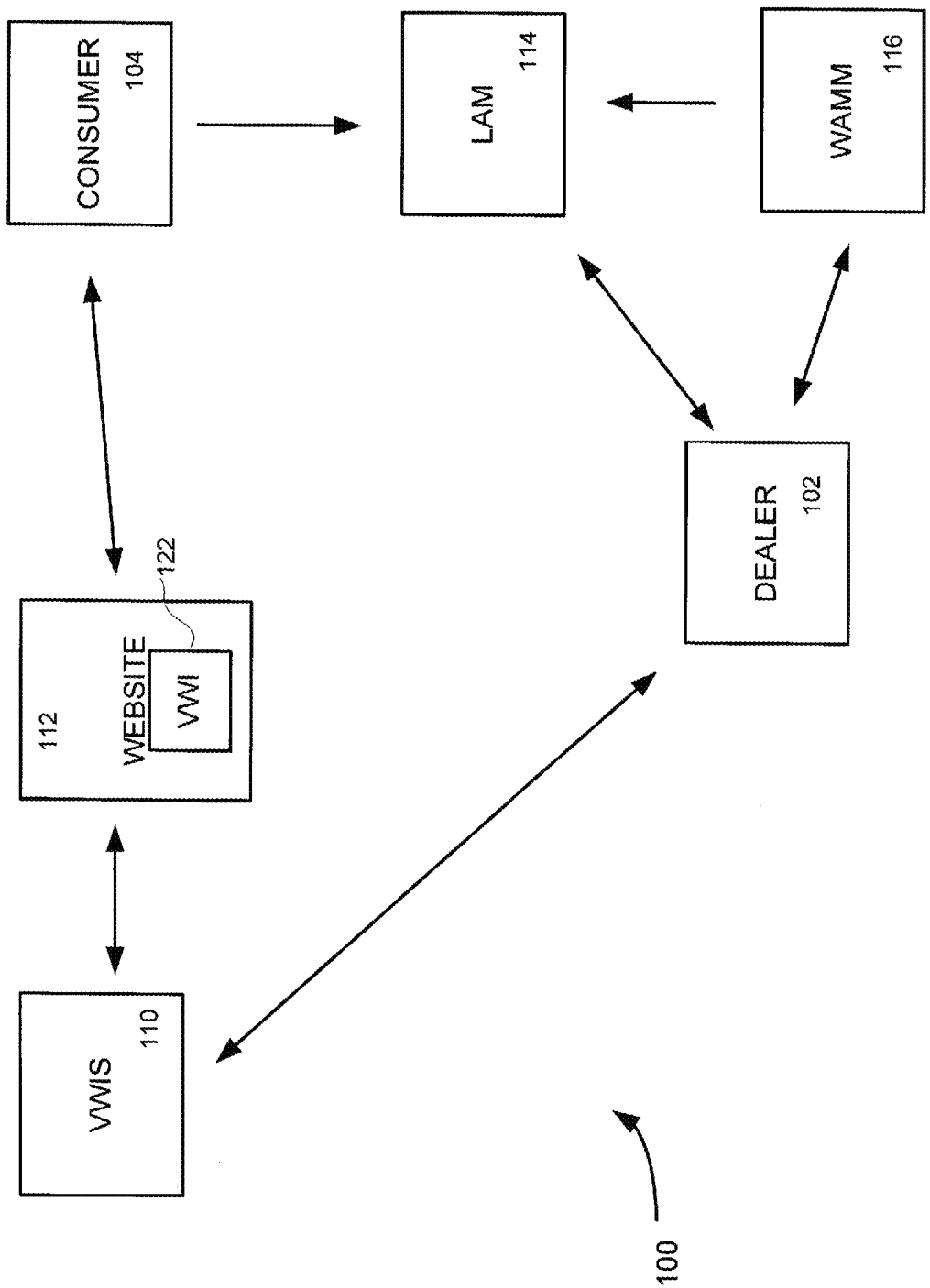
FIG. 1 is a block diagram of the Wholesale Virtual Inventory and Retail Lead Generation System (WVIRLGS), under an embodiment.

FIG. 1 is a block diagram of the Wholesale Virtual Inventory and Retail Lead Generation System (WVIRLGS) 100, under an embodiment. The WVIRLGS 100 described herein improves on the conventional models described above by allowing the dealer to capture interest from a specific, named retail consumer 104 on a specific vehicle available for purchase (by dealers 102 only) in a wholesale market prior to acquiring the inventory.

The WVIRLGS 100 comprises a virtual wholesale inventory service (VWIS) platform 110. The VWIS platform 110 includes at least one server or host computer network coupled to a database (not shown), wherein the server(s) executes or includes presentation logic, filters, and user modules as described in detail below. The host computer network serves the wholesale vehicle data for specific vehicles to a retail automotive "classified" web-site (or several websites) for the purpose of eventually selling a vehicle to a retail consumer. The host database includes a detailed description of each vehicle in the database, including the vehicle configuration and condition. The set of user modules provide for the display, configuration, deployment and management of the lead generation modules.

The VWIS platform 110 includes an administrative module (not shown) coupled to the server(s), as described in detail below. The administrative component of an embodiment is generally used by the provider of the VWIS, but is not so limited. The administrative component comprises one or more of an interface for enabling the exposure of the wholesale vehicle inventory, an interface for capturing detailed information about a dealer 102 registered to receive leads, and an interface for managing how the registered dealer 102 purchases leads.

The VWIS platform 110 is coupled or connected via a network to at least one remote electronic site or platform 112 that presents wholesale inventory to retail consumers 104, as described in detail below. The VWIS platform 110 also includes couplings or connections to dealers 102 via the network. The WVIRLGS includes a set of modules including, for example, a Virtual Wholesale Inventory (VWI) module 122, a Lead Acquisition Module (LAM) 114, and a Wholesale Automobile Market Module (WAMM) 116. The LAM 114 and WAMM 116 can be components of the VWIS platform 110, or can be hosted on one or more remote systems and coupled or connected to the VWIS platform 110.

The VWIS platform 110 presents or displays wholesale inventory to a retail consumer 104 using one or more different mechanisms. For example, inventory is presented using a service provider-owned and branded retail facing website. Inventory can also be presented using third party consumer-facing retail websites. Furthermore, inventory can be presented to a retail consumer using a dealer-owned website or kiosk. The retail consumer 104, upon establishing interest in a vehicle of the wholesale inventory, submits an expression of interest in the specific vehicle, thus creating a "lead".

The lead submitted by the retail consumer 104 can be made available to automobile dealers 102 using one or more different mechanisms. For example, information of the lead is presented or made available to a dealer 102 via a website where the leads can be accessed, viewed and acquired. Also, information of the lead is presented or made available to a dealer 102 via an electronic mail (email) message or other messaging approach.

The dealer 102 may be granted rights to access the leads through one or more of the following processes. For example, the lead may be provided to the dealer for free by the consignor or wholesale marketplace. Moreover, the dealer 102 can subscribe to receive all leads satisfying pre-specified criteria (e.g., within a certain area, a vehicle type and/or a specified time period, etc.). Additionally, dealers 102 can acquire the leads via a "pay per lead" model.

The WVIRLGS enables a dealer 102 to acquire the wholesale vehicle from which the lead was generated after viewing the lead details and, optionally, to initiate contact with the retail consumer 104 who generated the lead. As such, the WVIRLGS allows the dealer 102 to capitalize on a sales opportunity with greatly reduced risk in carrying inventory. Alternatively, the dealer 102 may already have a vehicle in stock matching the vehicle corresponding to the lead that resulted in the consumer interest and, as such, may be able to sell the existing vehicle to the consumer 104.

For a retail consumer 104, the WVIRLGS provides increased access to desirable inventory, and more efficient means for locating specific vehicles. For a dealer 102, the WVIRLGS provides increased retail business through matching available inventory with consumer interest, reduced inventory carrying costs, reduced time to "turn" inventory, and an increased ability to market services to a wider customer base. For a consignor, the WVIRLGS provides increased wholesale prices as a result of increased demand for the vehicle, and a quicker time to sell inventory through an increase in demand.

The WVIRLGS interface for enabling the exposure of the wholesale vehicle inventory can include a data feed, web-service, flat text file, XML file, ETL file, or other data file exchange enabling the display of wholesale units to retail customers via presentation of detailed information for vehicles available in a wholesale marketplace (i.e., online wholesale auction, physical auction, including "buy-price only" marketplaces). The administrative component, in providing or generating this interface, generates a file including vehicles available in the wholesale market with a goal of facilitating a partnership between a retail automotive web-site and the provider of the service. The file includes, and the interface presents or makes use of, a data set, where each record comprises specific information about a vehicle, including, but not limited to, vehicle year, make, model, trim, mileage, VWIN (full or partial), colors, engine, drivetrain, transmission, damage information, consignor comments and pictures.

The administrative component generates the data set to specific partners. The data set can be generated or provided to partners via file transfer of the current data set. The data set can also be generated or provided to partners via request/response as in a web service where a partner requests the latest available inventory data. The administrative component, within the file, also comprises a mechanism for communicating where leads generated by the retail consumer are sent.

The interface for enabling the exposure of the wholesale vehicle inventory can include a retail-focused website (e.g., retail site) of wholesale inventory listings. The website of wholesale inventory listings is run by the provider of the service (or in partnership with another company) and allows a retail consumer to search among vehicles available in the wholesale marketplace and express interest in specific vehicles. The interface can be generated by the provider and can take the form of a stand-alone website or a "portlet" imbedded within a partners website, primarily geared towards the retail consumer.

The website of wholesale inventory listings comprises an interface for searching the set of specific vehicles accessible through the VWI module. The website of wholesale inventory listings can also comprise an interface for viewing the search results produced by the search interface. The website of wholesale inventory listings also can comprise an interface for viewing the details of a specific vehicle (i.e. a detail page), such as the year, make, model, trim, mileage, VWIN (full or partial), color, engine, drivetrain, transmission, damage information, consignor comments and pictures. The website of wholesale inventory listings can comprise an interface for the retail consumer to "express interest", thereby generating a "lead". This interface may require the inclusion of contact information for the retail consumer.

The interface for enabling the exposure of the wholesale vehicle inventory can include a "module" (i.e. portlet) that is or could be incorporated into a third party web-site (e.g., a specific dealer web-site, a third party retail classifieds web-site, etc). The module, which is referred to herein as the Virtual Wholesale Inventory module (VWI), is generated by the provider and is primarily geared towards the retail consumer. The VWI module allows a retail consumer to search among vehicles available in the wholesale marketplace and express interest in specific vehicles. The VWI module includes an interface for searching the set of vehicles accessible through the VWI module. The VWI module includes an interface for viewing the search results produced by the search interface. The VWI includes an interface for viewing the details of a specific vehicle (i.e. a detail page), such as the year, make, model, trim, mileage, VWIN (full or partial), color, engine, drivetrain, transmission, damage information, consignor comments, and pictures. The VWI includes an interface for the retail consumer to "Express interest", thereby generating a "lead"; this interface may request a retail consumer to provide contact information. Each dealer web-site that presents the VWI can be independently owned and operated and have an independent URL.

The administrative component of an embodiment comprises an interface for capturing detailed information about a dealer registered to receive leads generated from the service, such as name, address, phone number and contacts.

The administrative component of an embodiment comprises an interface for managing whether the registered dealer is buying leads on a per transaction basis or a subscription basis. The subscription basis for buying leads comprises providing the dealer with exclusive rights to all leads generated by consumers within the defined geographic region.

The administrative component of an embodiment optionally comprises an interface for storing information related to payment for the acquired leads. The administrative component also optionally comprises an interface for managing a username and password for the dealer to access the LAM. Additionally, the administrative component optionally comprises an interface for managing which consignor's vehicles are visible through a data feed or on the retail-focused web-site. Furthermore, the administrative component optionally comprises an interface for establishing communication preferences, methods and contacts at the automobile dealer for leads generated from the presentation of the wholesale vehicles on the retail-focused web-site.

The LAM 114 is hosted by or coupled to the provider, primarily for use by a retail automobile dealer. The LAM 114 of an embodiment comprises at least one of the following interfaces, but the embodiment is not so limited: an interface for a dealer to enter a username and password to enter the module; an interface for searching the leads that have been generated; an interface for viewing a list of leads; an interface for viewing the details of a specific lead; an interface for acquiring the contact information of the retail consumer that generated the lead and a link to details for purchasing the specific vehicle from which the lead was generated; an interface for managing payment for the acquired leads; an interface for viewing and managing any leads previously acquired.

The WAMM 116 is hosted by or coupled to the provider and enables licensed dealers to purchase wholesale automotive inventory, and can be administered by the provider or a partner. The WAAM 116 of an embodiment comprises at least one of the following interfaces, but the embodiment is not so limited: an interface to register for access to the system; an interface for searching for a set of wholesale VWIN-specific inventory; an interface for viewing the search results produced by the search interface; an interface for viewing the details of a specific vehicle (e.g., a detail page), such as the year, make, model, trim, mileage, VWIN (full or partial), color, engine, drivetrain, transmission, damage information, consignor comments and pictures; an interface for bidding on or buying the available vehicle.

Figure 2:
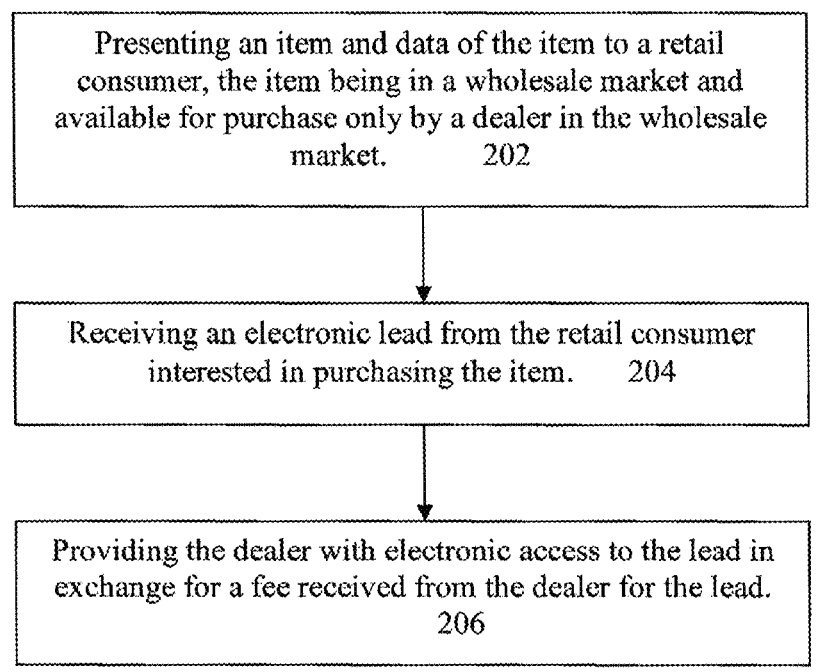
FIG. 2 is a flow diagram for generating retail leads on vehicles in wholesale inventory and providing the electronic leads to a dealer before the dealer acquires the inventory, under an embodiment.

FIG. 2 is a flow diagram 200 for generating retail leads on vehicles in wholesale inventory and providing the electronic leads to a dealer before the dealer has acquired the inventory that generated the lead, under an embodiment. Generally, the WVIRLGS presents an item and data of the item to a retail consumer 202. The item is in a wholesale market and available for purchase only by a dealer in the wholesale market. The WVIRLGS receives an electronic lead from the retail consumer interested in purchasing the item 204. A dealer is provided with electronic access to the lead in exchange for a fee received from the dealer for the lead 206. The dealer can use information of the lead to consider acquiring the vehicle.

Figure 3:
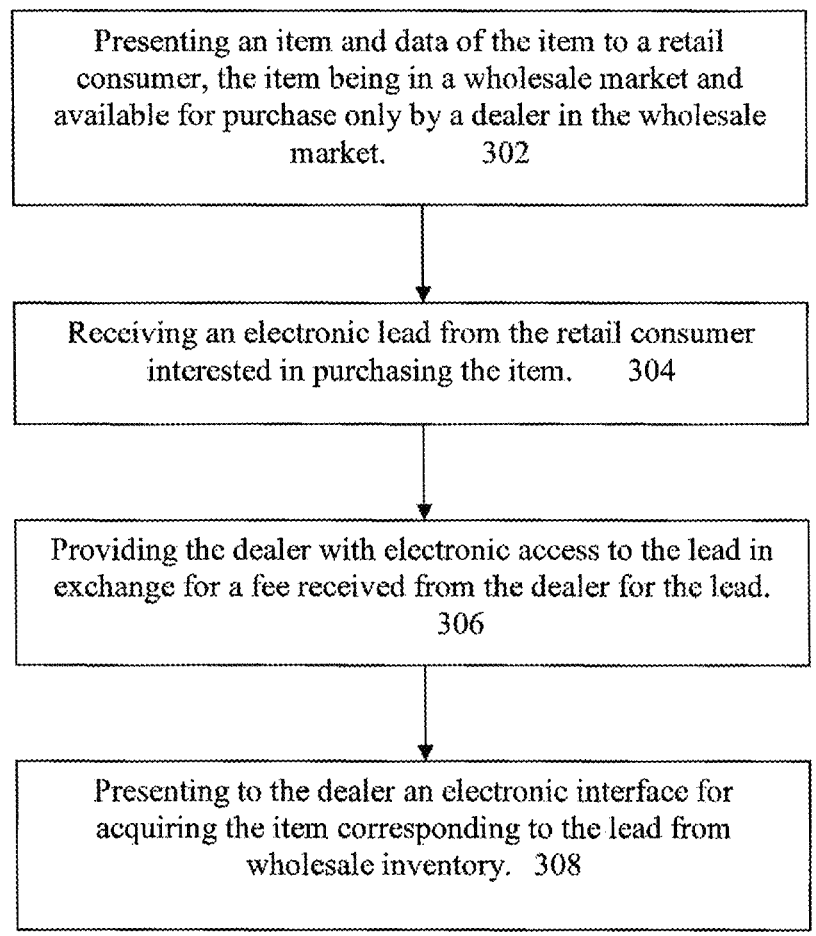
FIG. 3 is a flow diagram for generating retail leads on vehicles in wholesale inventory and providing the electronic leads to a dealer that uses the leads to consider acquiring the vehicle, under an embodiment.

For example, FIG. 3 is a flow diagram 300 for generating retail leads on vehicles in wholesale inventory and providing the electronic leads to a dealer that uses the leads to consider acquiring the vehicle, under an embodiment. The WVIRLGS presents an item and data of the item to a retail consumer 302. The item is in a wholesale market and available for purchase only by a dealer in the wholesale market. The WVIRLGS receives an electronic lead from the retail consumer interested in purchasing the item 304. A dealer is provided with electronic access to the lead in exchange for a fee received from the dealer for the lead 306. The WVIRLGS includes or presents to the dealer an electronic interface for acquiring the item corresponding to the lead from wholesale inventory 308.

FIGS. 4-17 present numerous example methods and processes under the WVIRLGS of one or more embodiments.

The embodiments presented in these examples, however, are not limited to the configurations and/or methods described in these examples.

Figure 4:
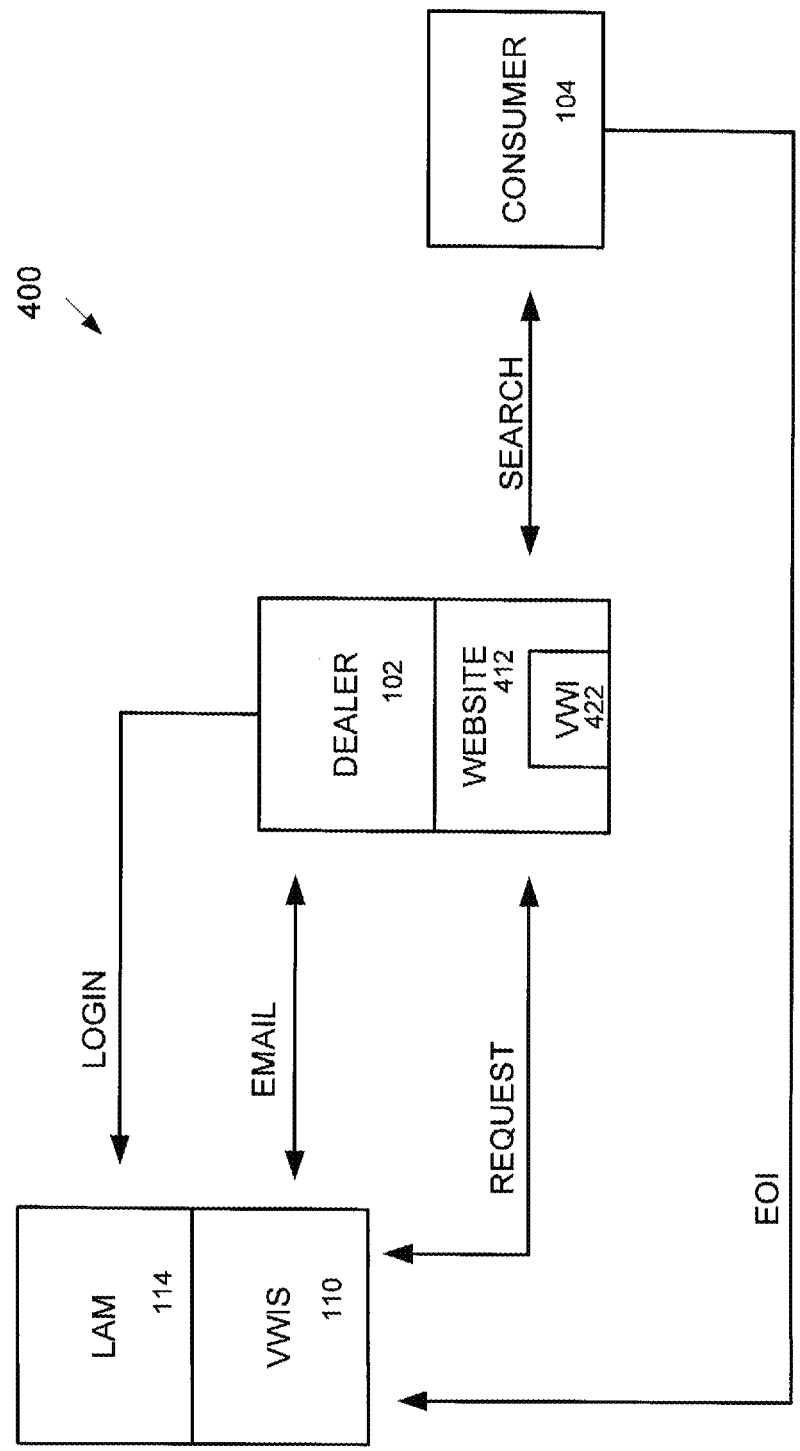
FIG. 4 is a block diagram of the WVIRLGS having the VWI integrated in a dealer retail website, under an embodiment.

FIG. 4 is a block diagram of the WVIRLGS 400 having the VWI 422 integrated in a dealer retail website 412, under an embodiment. The VWIS platform 110 includes and/or is coupled or connected to the LAM 114 but is not so limited.

Figure 5:
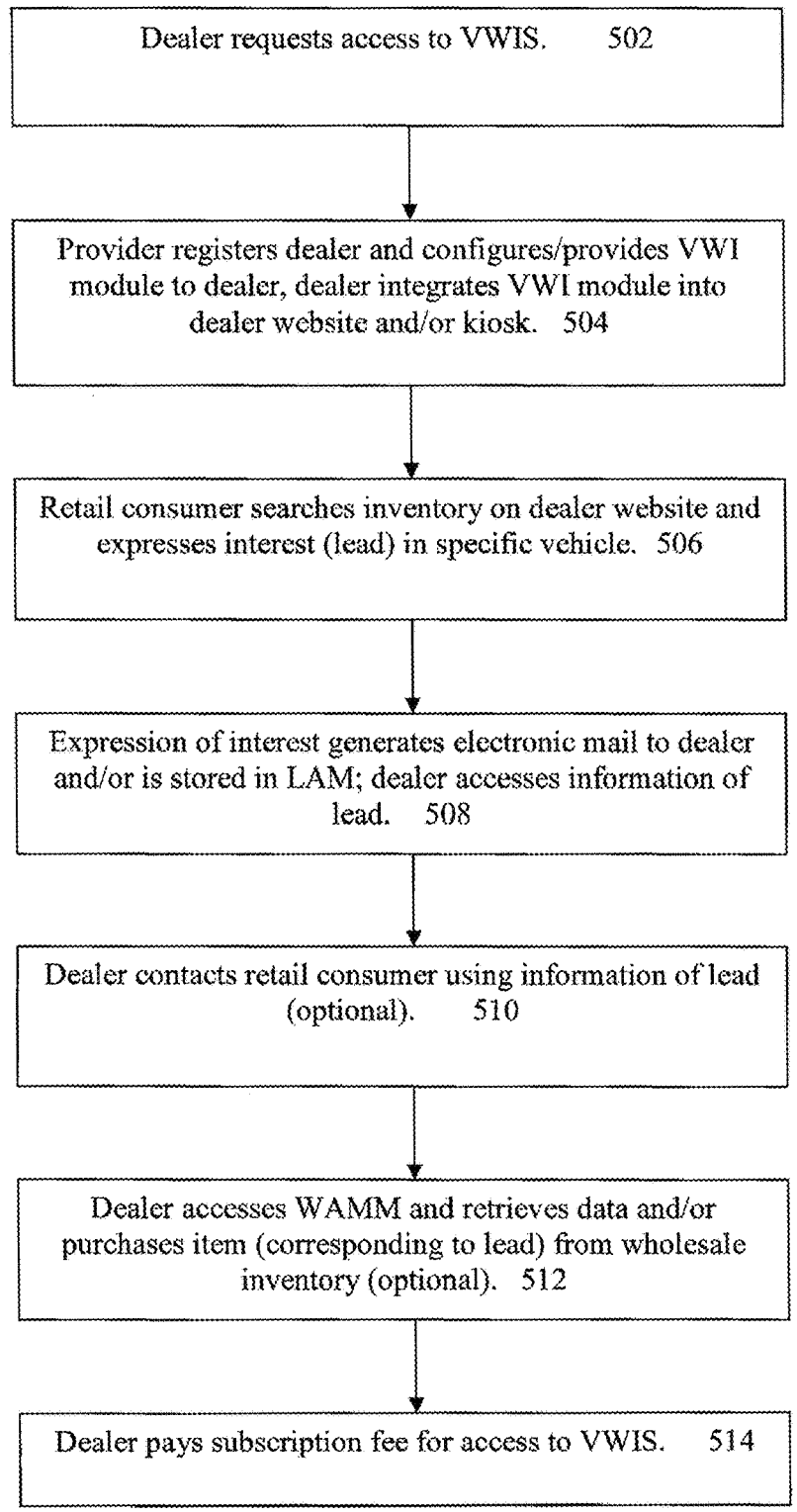
FIG. 5 is a flow diagram of the WVIRLGS describing use of the VWI Module with a subscription model, under an embodiment.

As a first example, FIG. 5 is a flow diagram 500 of the WVIRLGS describing use of the VWI Module with a subscription model, under an embodiment. In this first example, described with reference to FIGS. 4 and 5, a dealer contacts the provider of the Virtual Wholesale Inventory service and requests access to a module/portlet to embed in the dealer's web-site 502. The provider registers the dealer, using the Administrative Module and enables a VWI Module for the dealer 504. The VWI Module generates leads specifically to the registered dealer. The dealer is charged a subscription fee for accessing the service 514; optionally, the dealer can be billed at pre-set intervals for access to the service. The provider configures filters to determine the wholesale vehicles that are available within the virtual inventory module. The provider sends the dealer an appropriate code and instructions detailing how to incorporate the VWI module into the dealer's web-site or interactive kiosk. Upon receipt of the VWI module, the dealer installs the VWI Module 504.

The example continues when a consumer visits the dealer's web-site, searches for inventory in the VWI Module and expresses interest in a specific vehicle 506. The expression of interest generates an electronic mail to the dealer 508. Alternatively, the expression of interest is stored in the LAM 508. Under another alternative, the expression of interest generates an electronic mail to the dealer and, additionally, is stored in the LAM 508.

The dealer either retrieves the electronic mail or logs into the LAM, as appropriate to the alternative instantiated above for handling the expression of interest. Optionally, the dealer contacts the consumer and discusses purchase of the vehicle on which the consumer expressed interest 510. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 512. As another option, the dealer acquires the vehicle from the Wholesale Automobile Market Module, where the vehicle corresponds to the expression of interest, and plans to sell the vehicle to the consumer.

Figure 6:
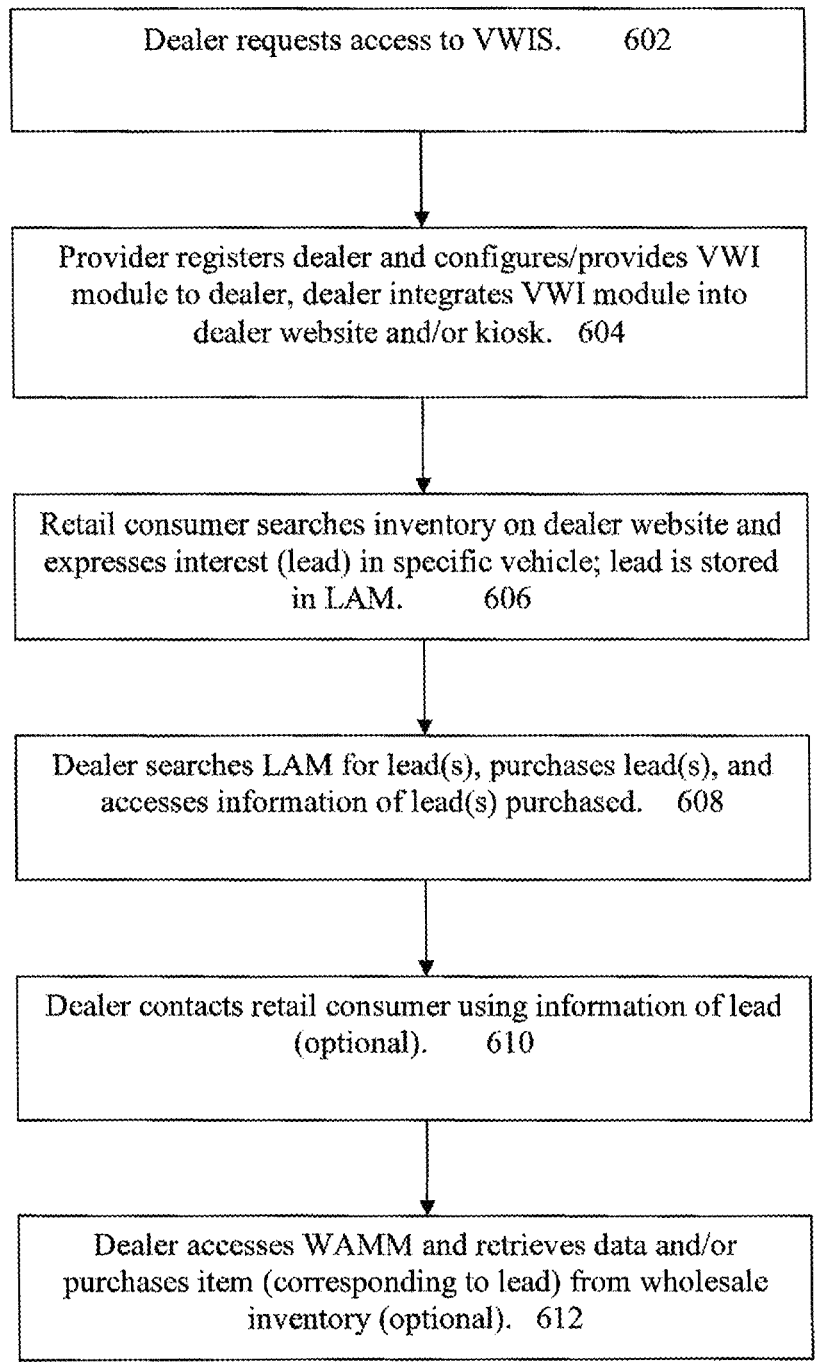
FIG. 6 is a flow diagram of the WVIRLGS describing use of the VWI Module and a pay-per-acquired-lead (PPAL) model, under an embodiment.

As a second example, FIG. 6 is a flow diagram 600 of the WVIRLGS 400 describing use of the VWI Module and a pay-per-acquired-lead (PPAL) model, under an embodiment. In this second example, described with reference to FIGS. 4 and 6, a dealer contacts the provider of the Virtual Wholesale Inventory Service and requests access to the service 602. In response, the provider registers the dealer, using the Administrative Module 604. The provider also enables a VWI Module, which will generate leads specifically to the registered dealer 604. The dealer is configured to pay a fee to the provider for each lead acquired. The provider configures filters to determine the wholesale vehicles that are available within the virtual inventory module. The provider sends the dealer an appropriate code and instructions detailing how to incorporate the VWI module into the dealer's web-site or interactive kiosk 604. Upon receipt of the VWI module, the dealer installs the VWI Module 604.

The example continues when a consumer visits the dealer's web-site, searches for inventory in the VWI Module and expresses interest in a specific vehicle 606. The expression of interest is stored in the LAM 606. The dealer logs into the LAM, and searches for leads 608. Using the search results, the dealer decides to acquire the newly received lead 608. In response to this acquisition decision, the dealer is charged for the lead before the contact information for the consumer that generated the lead is provided or made visible 608.

Optionally, the dealer contacts the consumer and discusses purchase of the vehicle on which the consumer expressed interest 610. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 612. As another option, the dealer acquires the vehicle from the Wholesale Automobile Market Module, where the vehicle corresponds to the expression of interest, and plans to sell the vehicle to the consumer 612.

Figure 7:
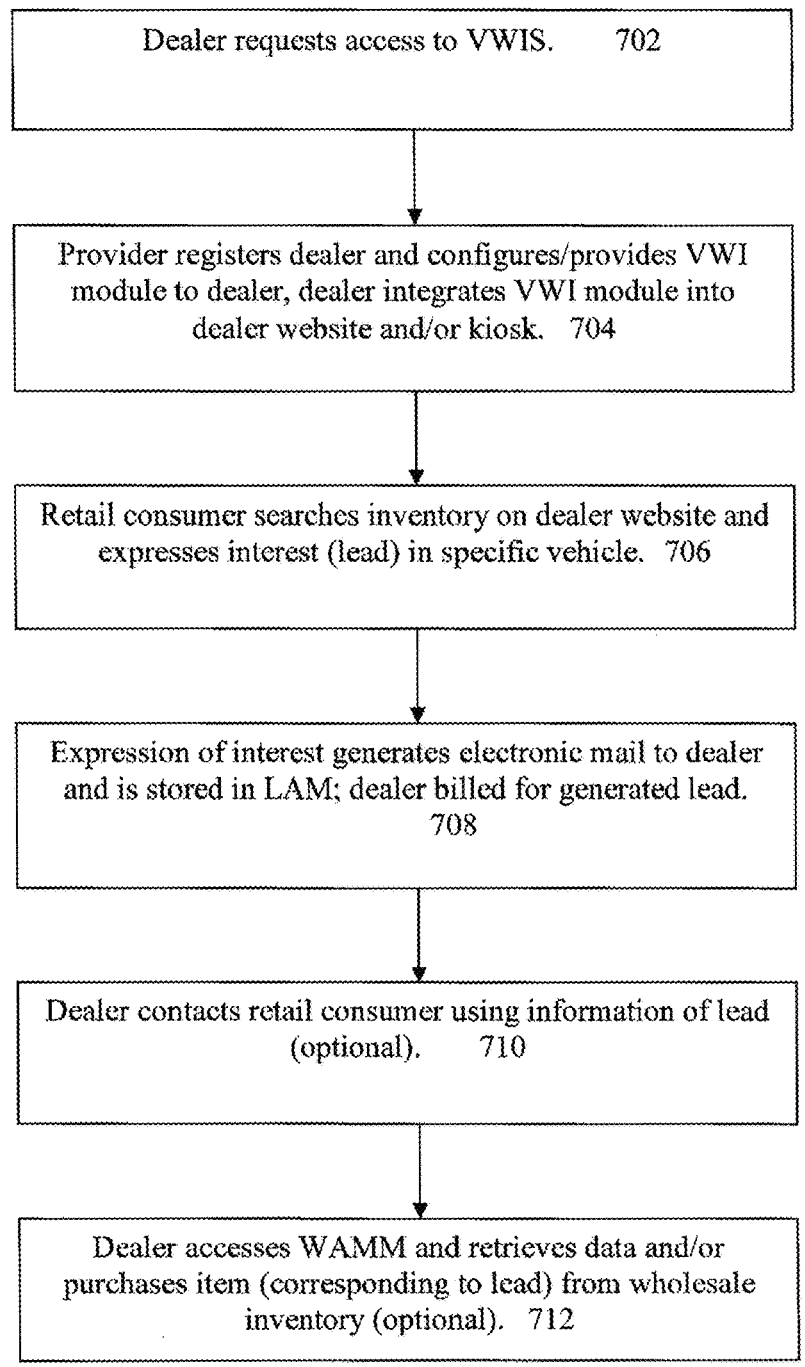
FIG. 7 is a flow diagram of the WVIRLGS describing use of the VWI Module and a pay-per-generated-lead (PPGL) model, under an embodiment.

As a third example, FIG. 7 is a flow diagram 700 of the WVIRLGS 400 describing use of the VWI Module and a pay-per-generated-lead (PPGL) model, under an embodiment. In this third example, described with reference to FIGS. 4 and 7, a dealer contacts the provider of the Virtual Wholesale Inventory service and requests access to the service 702. In response, the provider registers the dealer, using the Administrative Module, and configures the VWI Module to include the dealer's specific contact information for leads 704. The dealer is configured to pay a fee to the provider for each lead generated. The provider configures filters to determine the wholesale vehicles that are available within the virtual inventory module. The provider sends the dealer an appropriate code and instructions detailing how to incorporate the VWI module into the dealer's web-site or interactive kiosk. Upon receipt of the VWI module, the dealer installs the VWI Module 704.

The example continues when a consumer visits the dealer's web-site, searches for inventory in the VWI Module and expresses interest in a specific vehicle 706. The expression of interest generates an electronic mail to the dealer 708. The expression of interest is also stored in the LAM 708. The dealer is billed for the lead when the lead is generated 708.

Optionally, the dealer contacts the consumer and discusses purchase of the vehicle on which the consumer expressed interest 710. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 712. As another option, the dealer acquires the vehicle from the Wholesale Automobile Market Module, where the vehicle corresponds to the expression of interest, and plans to sell the vehicle to the consumer 712.

Figure 8:
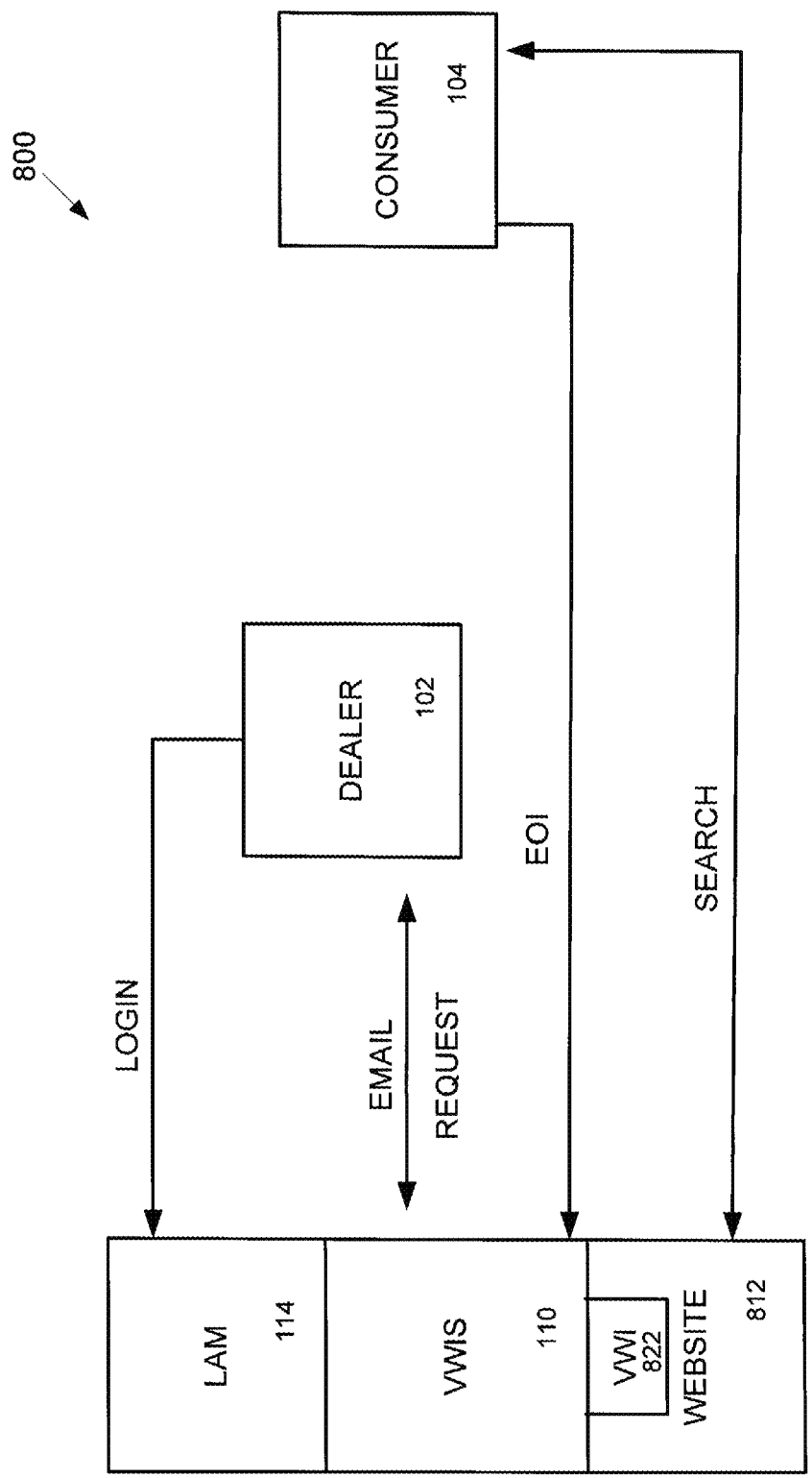
FIG. 8 is a block diagram of the WVIRLGS having the VWI integrated in a provider retail website (independent of the dealer), under an embodiment.

FIG. 8 is a block diagram of the WVIRLGS 800 having the VWI 822 integrated in a provider retail website 812 (independent of the dealer), under an embodiment. The VWIS platform 110 includes and/or is coupled or connected to the LAM 114 but is not so limited.

Figure 9:
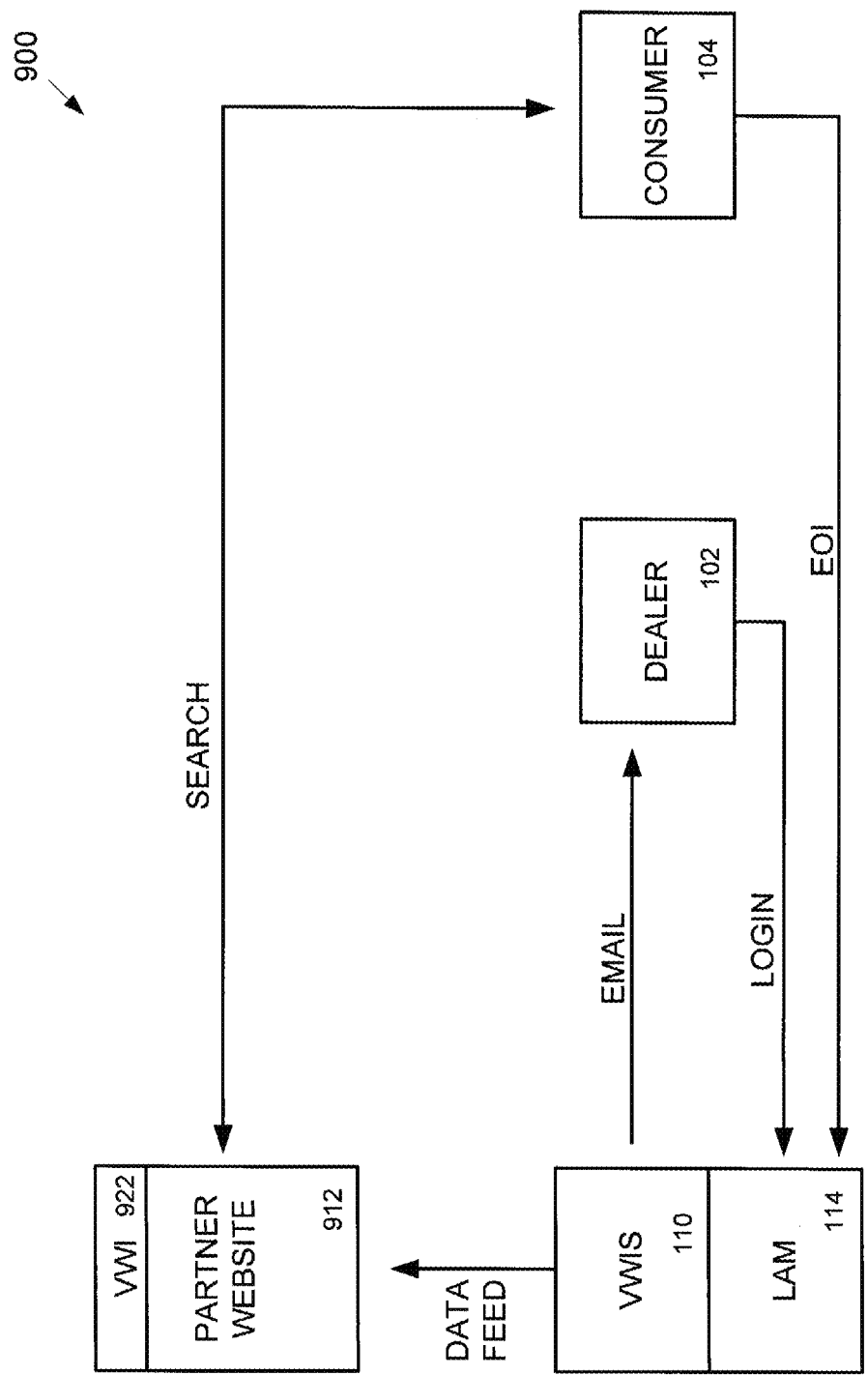
FIG. 9 is a block diagram of the WVIRLGS having the VWI integrated in a partner retail website (independent of the dealer), under an embodiment.

FIG. 9 is a block diagram of the WVIRLGS 900 having the VWI 922 integrated in a partner retail website 912 (independent of the dealer), under an embodiment. The VWIS platform 110 includes and/or is coupled or connected to the LAM 114 but is not so limited.

Figure 10:
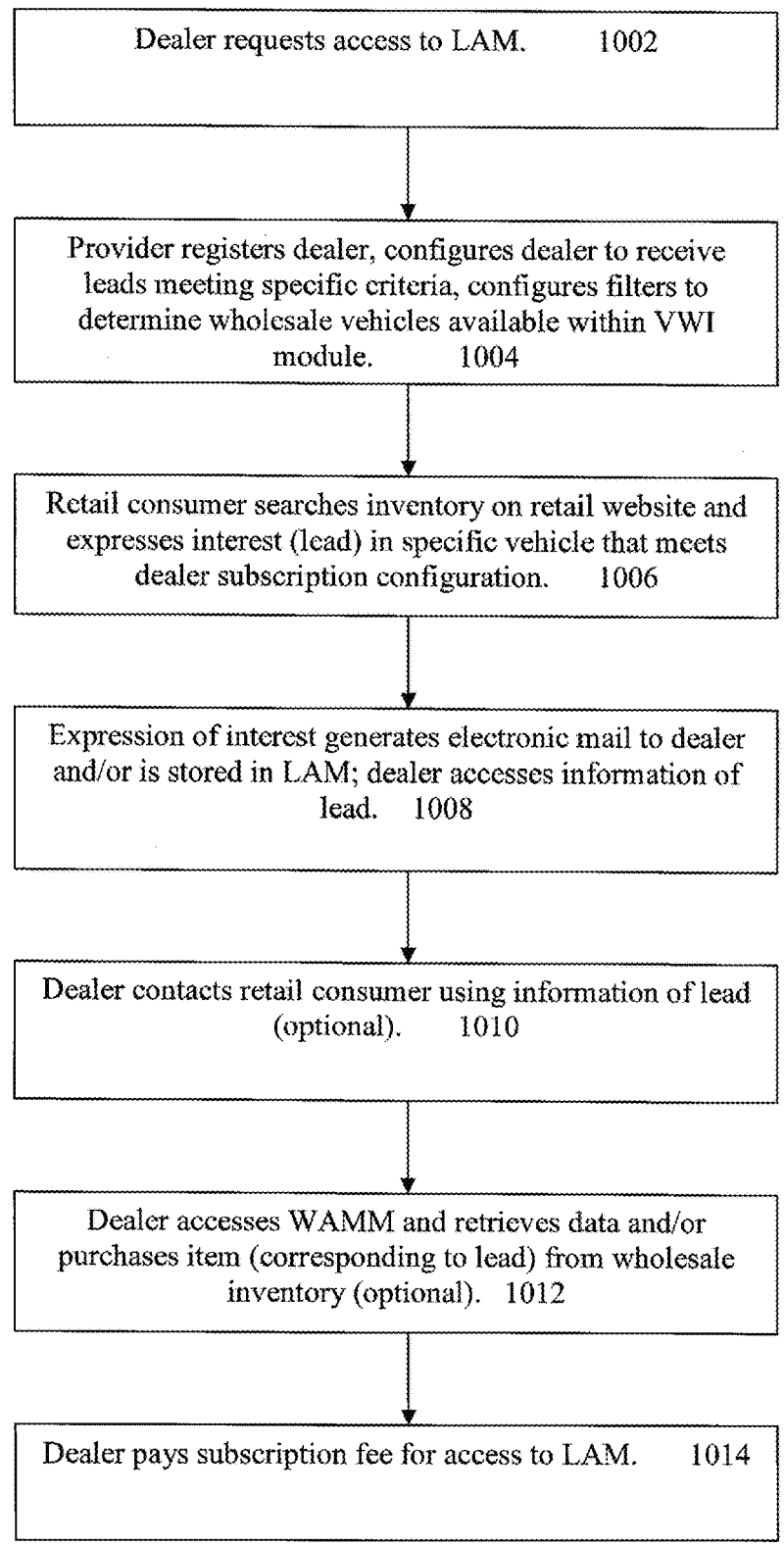
FIG. 10 is a flow diagram of the WVIRLGS describing use of the LAM with a subscription model, under an embodiment.

As a fourth example, FIG. 10 is a flow diagram 1000 of the WVIRLGS 800/900 describing use of the LAM with a subscription model, under an embodiment. In this fourth example, described with reference to FIGS. 8-10, a dealer contacts the provider of the Virtual Wholesale Inventory service and requests access to the LAM 1002. Alternatively, a dealer can use a self-registration process to register for and request access to the LAM. The dealer is billed a subscription fee (e.g., at preset intervals) for access to the service 1014. The provider registers the dealer, using the Administrative Module, and configures the dealer to receive all leads meeting specific criteria (e.g., geographic criteria, vehicle type criteria, vehicle pricing criteria, etc.) 1004. The provider configures filters to determine the wholesale vehicles that are available within the virtual inventory module 1004.

The example continues when a consumer visits the provider's retail website on which the Wholesale Inventory is listed 1006. Alternatively, the consumer can visit a partner retail website on which the Wholesale Inventory is listed, where the partner site received the Wholesale Inventory via a data feed from the provider. The consumer searches for inventory and expresses interest in a specific vehicle that meets the registered dealer's subscription configuration 1006. The expression of interest generates an electronic mail to the dealer 1008. Alternatively, the expression of interest is stored in the LAM 1008. Under another alternative, the expression of interest generates an electronic mail to the dealer and, additionally, is stored in the LAM 1008.

The dealer either reviews the electronic mail or logs into the LAM and views the lead details (including contact information for consumer generated the lead), as appropriate to the alternative instantiated above for handling the expression of interest 1008. Optionally, the dealer contacts the consumer and discusses purchase of the vehicle on which the consumer expressed interest 1010. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 1012. As another option, the dealer acquires the vehicle from the Wholesale Automobile Market Module, where the vehicle corresponds to the expression of interest, and plans to sell the vehicle to the consumer 1012.

Figure 11:
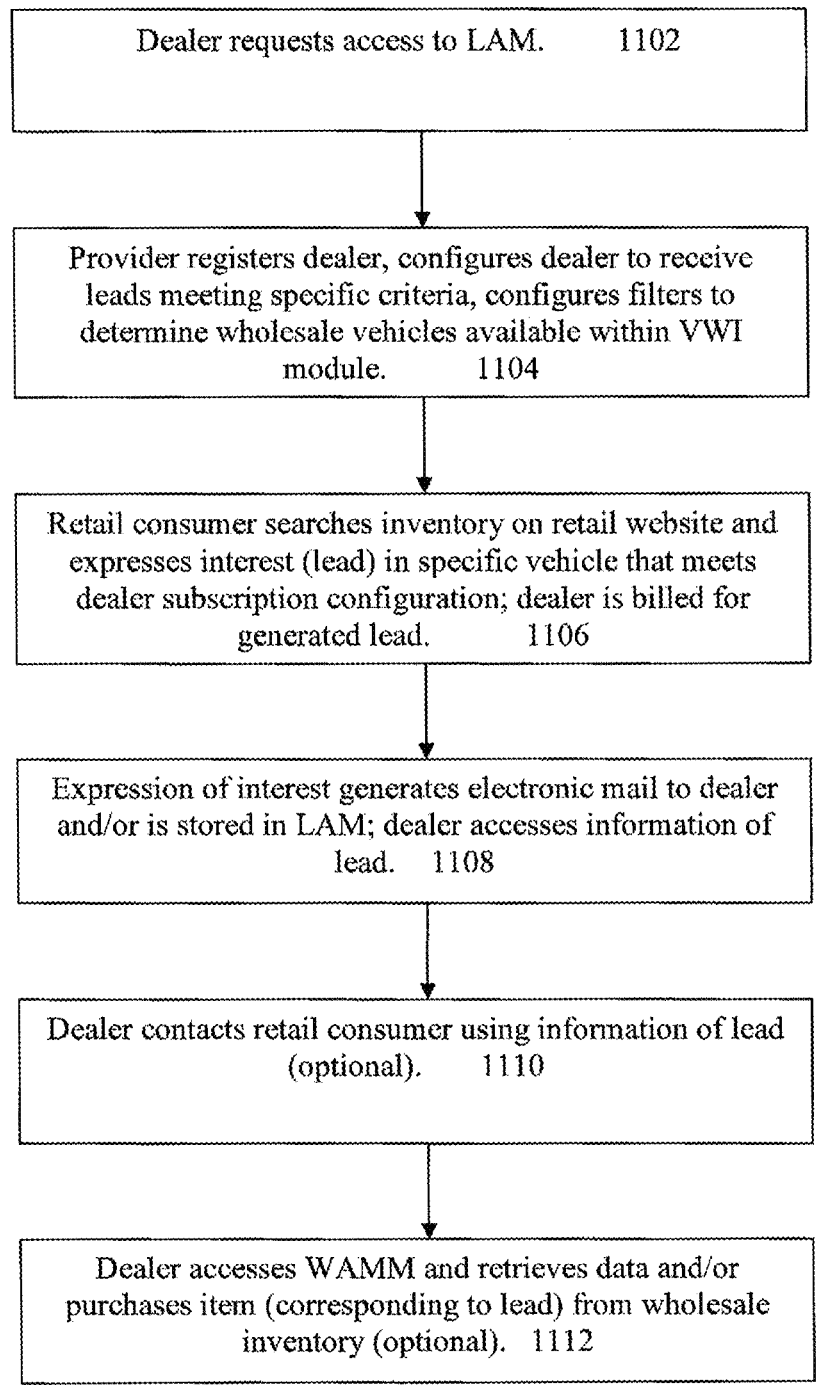
FIG. 11 is a flow diagram of the WVIRLGS describing use of the LAM with a pay-per-generated-lead (PPGL) model, under an embodiment.

As a fifth example, FIG. 11 is a flow diagram 1100 of the WVIRLGS 800/900 describing use of the LAM with a pay-per-generated-lead (PPGL) model, under an embodiment. In this fifth example, described with reference to FIGS. 8, 9 and 11, a dealer contacts the provider of the Virtual Wholesale Inventory service and requests access to the LAM 1102. Alternatively, a dealer can use a self-registration process to register for and request access to the LAM. The provider registers the dealer, using the Administrative Module, and configures the dealer to receive all leads meeting specific criteria (e.g., geographic criteria, vehicle type criteria, vehicle pricing criteria, etc.) 1104. The provider also configures the dealer to be billed for each generated lead. The provider configures filters to determine the wholesale vehicles that are available within the virtual inventory module 1104.

The example continues when a consumer visits the provider's retail website on which the Wholesale Inventory is listed 1106. Alternatively, the consumer can visit a partner retail website on which the Wholesale Inventory is listed, where the partner site received the Wholesale Inventory via a data feed from the provider. The consumer searches for inventory and expresses interest in a specific vehicle that meets the registered dealer's subscription configuration 1106. The expression of interest generates an electronic mail to the dealer 1108. Alternatively, the expression of interest is stored in the LAM 1108. Under another alternative, the expression of interest generates an electronic mail to the dealer and, additionally, is stored in the LAM 1108. Regardless of alternative, the dealer is billed for the generated lead 1106.

The dealer either reviews the electronic mail or logs into the LAM and views the lead details (including contact information for consumer generated the lead), as appropriate to the alternative instantiated above for handling the expression of interest 1108. Optionally, the dealer contacts the consumer and discusses purchase of the vehicle on which the consumer expressed interest 1110. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 1112. As another option, the dealer acquires the vehicle from the Wholesale Automobile Market Module, where the vehicle corresponds to the expression of interest, and plans to sell the vehicle to the consumer 1112.

Figure 12:
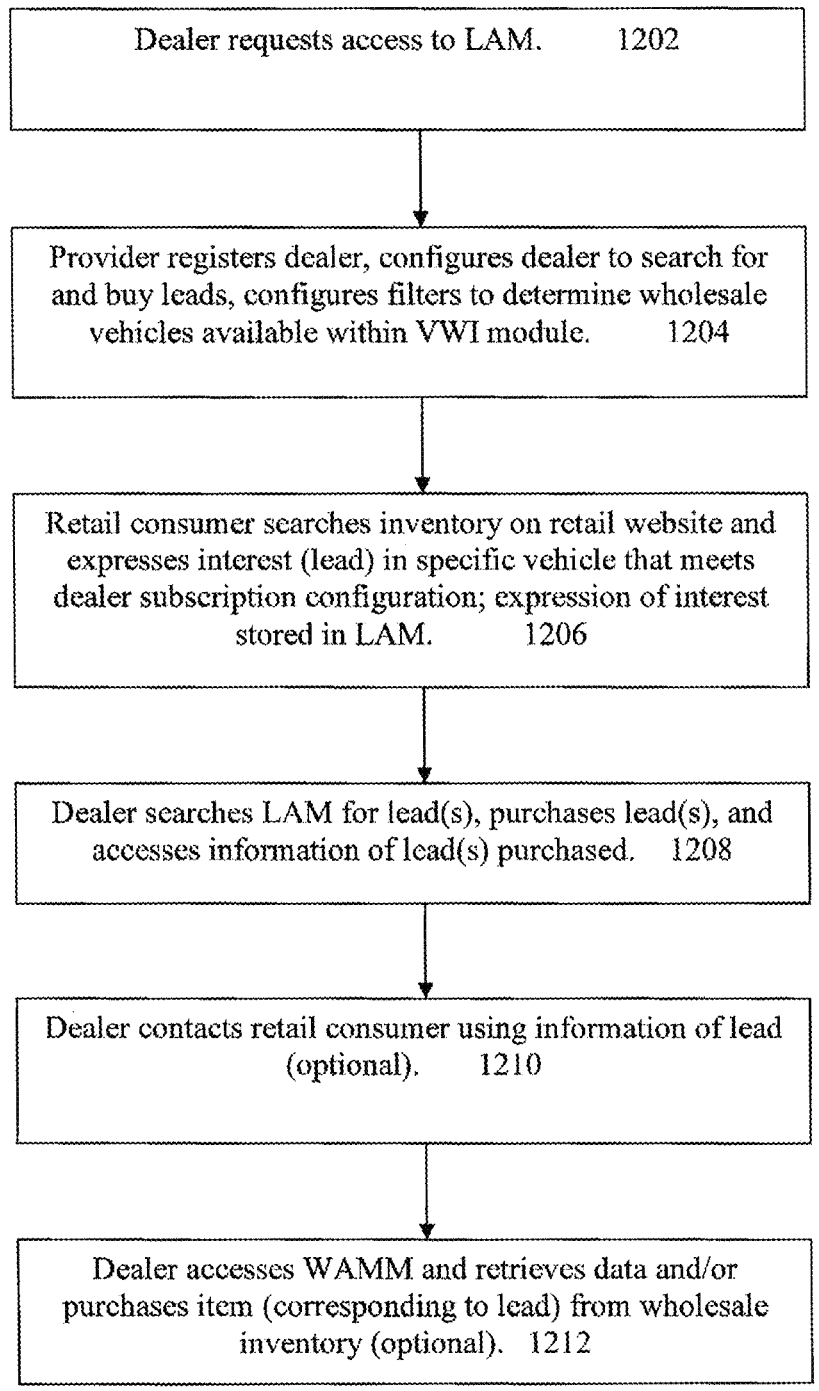
FIG. 12 is a flow diagram of the WVIRLGS describing use of the LAM with a pay-per-acquired-lead (PPAL) model, under an embodiment.

As a sixth example, FIG. 12 is a flow diagram 1200 of the WVIRLGS 800/900 describing use of the LAM with a pay-per-acquired-lead (PPAL) model, under an embodiment. In this sixth example, described with reference to FIGS. 8, 9 and 12, a dealer contacts the provider of the Virtual Wholesale Inventory service and requests access to the LAM 1202. Alternatively, a dealer can use a self-registration process to register for and request access to the LAM. The provider registers the dealer, using the Administrative Module, and configures the dealer to be able to search for and buy leads generated from the service 1202. The provider configures filters to determine the wholesale vehicles that are available within the virtual inventory module 1202.

The example continues when a consumer visits the provider's retail website on which the Wholesale Inventory is listed 1206. Alternatively, the consumer can visit a partner retail website on which the Wholesale Inventory is listed, where the partner site received the Wholesale Inventory via a data feed from the provider. The consumer searches for inventory and expresses interest in a specific vehicle 1206. The expression of interest is stored in the LAM 1206. Also, the expression of interest can generate an electronic mail to the dealer 1206.

The dealer logs into the LAM and acquires the lead details (including contact information for consumer generated the lead), and the dealer is billed for the acquired lead 1208. Optionally, the dealer contacts the consumer and discusses purchase of the vehicle on which the consumer expressed interest 1210. If the dealer has a similar but alternative vehicle available, the dealer may choose to sell the alternative vehicle to the consumer. As a further option, the dealer links to access the necessary information of the vehicle available for purchase in the Wholesale Automobile Market Module, where the vehicle corresponds to the expression of interest 1212. As another option, the dealer acquires the vehicle from the Wholesale Automobile Market Module, where the vehicle corresponds to the expression of interest, and plans to sell the vehicle to the consumer 1212.

Figure 13:
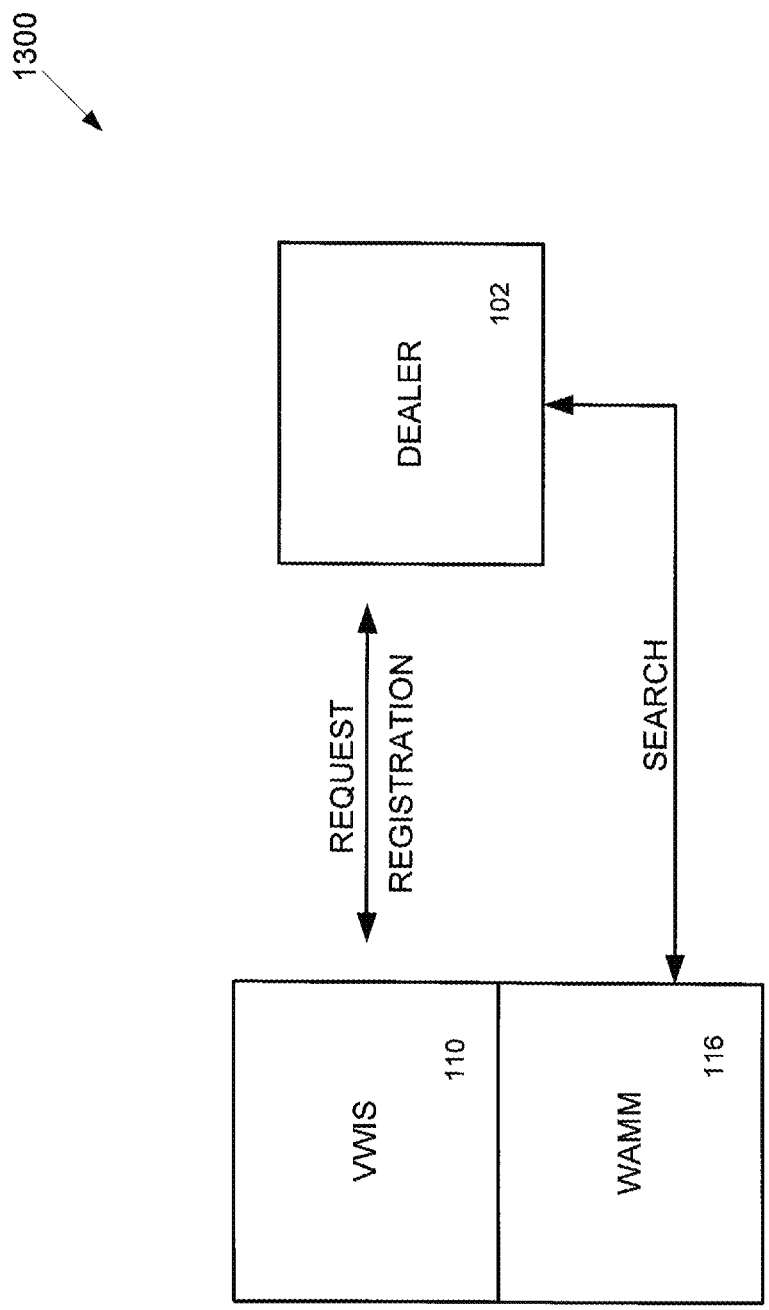
FIG. 13 is a block diagram of the WVIRLGS including the WAMM, under an embodiment.

FIG. 13 is a block diagram of the WVIRLGS 1300 including the WAMM, under an embodiment. The VWIS platform 110 includes and/or is coupled or connected to the WAMM 116 but is not so limited.

Figure 14:
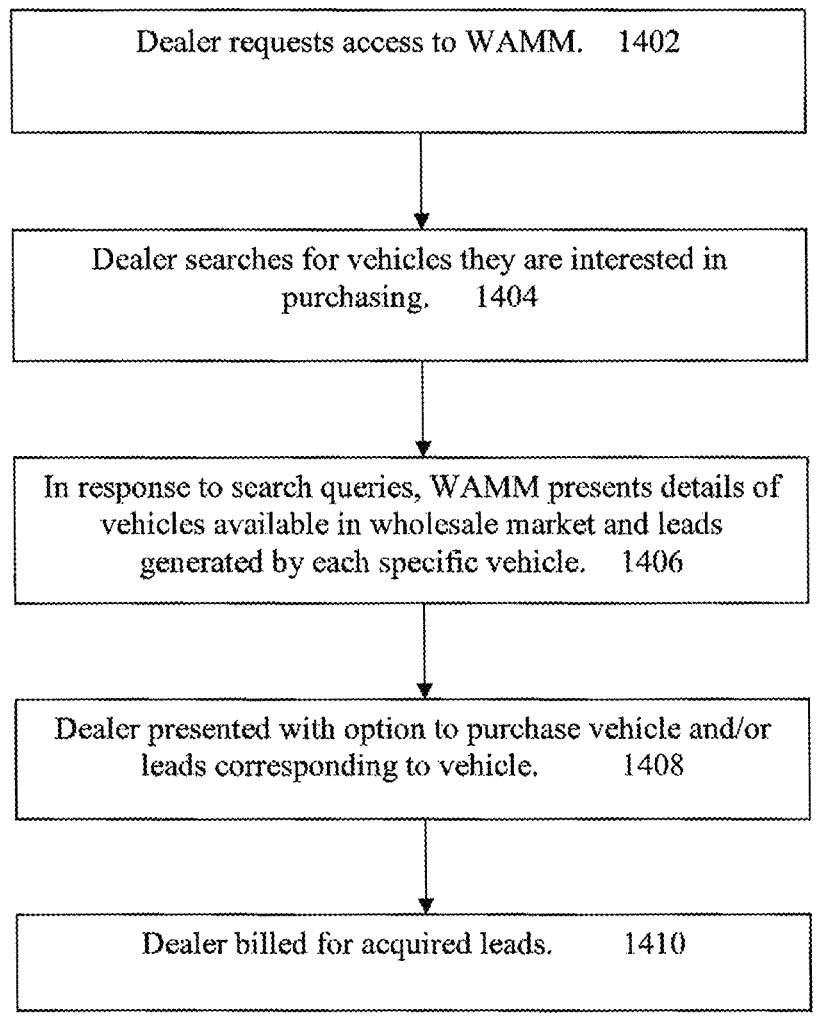
FIG. 14 is a flow diagram of the WVIRLGS describing use of the WAMM and a pay-per-acquired-lead (PPAL) model, under an embodiment.

As a seventh example, FIG. 14 is a flow diagram of the WVIRLGS 1300 describing use of the WAMM and a pay-per-acquired-lead (PPAL) model, under an embodiment. In this seventh example, described with reference to FIGS. 13 and 14, a dealer contacts the provider of the WAMM and requests access to the service 1402. Alternatively, a dealer can use a self-registration process to register for and request access to the WAMM. Using the WAMM, the dealer searches for vehicles that they have an interested in acquiring 1404. The searching enables a dealer to locate a VIN-specific vehicle that they have an interest in purchasing. Search results are displayed, including detail information of vehicles identified in the search 1406. Displayed or presented on the vehicle detail page of each vehicle is an indicator of the number of leads that have been generated by the vehicle 1406. The dealer can choose to purchase leads when purchasing the vehicle 1408. Alternatively, the dealer can purchase the leads separately without purchasing the vehicle. The dealer is billed for the acquired lead 1410.

Figure 15:
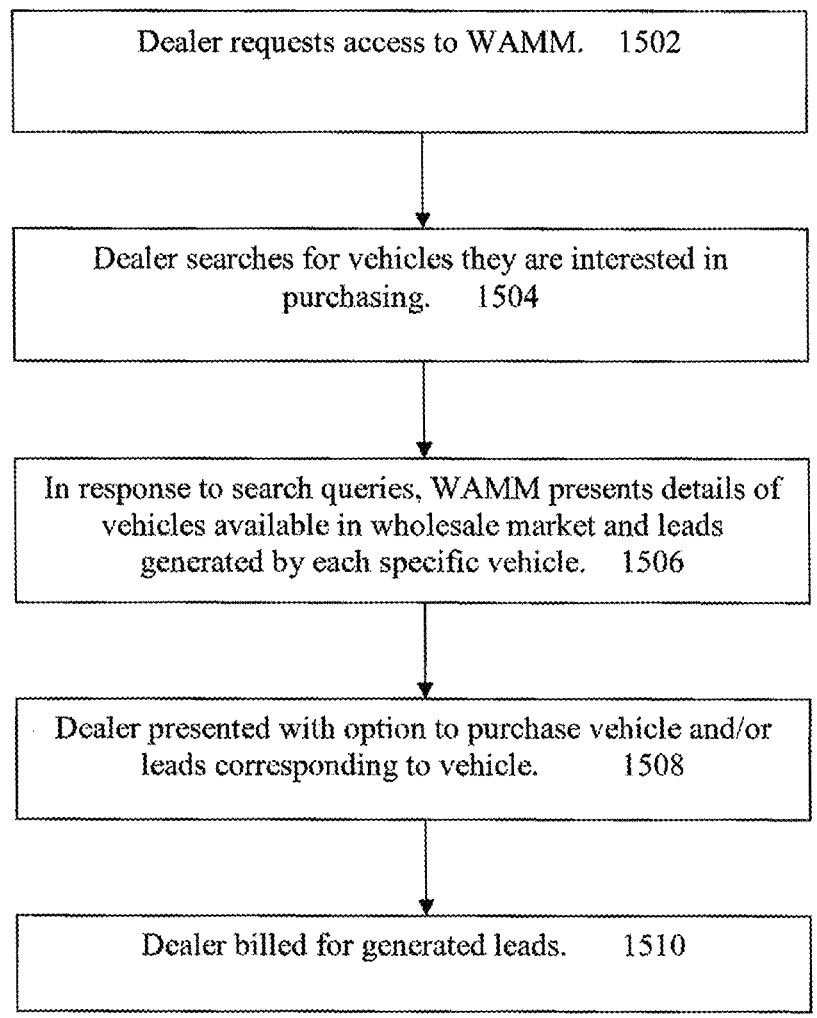
FIG. 15 is a flow diagram of the WVIRLGS describing use of the WAMM and a pay-per-generated-lead (PPGL) model, under an embodiment.

As an eighth example, FIG. 15 is a flow diagram of the WVIRLGS 1300 describing use of the WAMM and a pay-per-generated-lead (PPGL) model, under an embodiment. In this eighth example, described with reference to FIGS. 13 and 15, a dealer contacts the provider of the WAMM and requests access to the service 1502. Alternatively, a dealer can use a self-registration process to register for and request access to the WAMM. The dealer is billed for generated leads 1510. Using the WAMM, the dealer searches for vehicles that they have an interested in acquiring 1504. The dealer locates a VIN-specific vehicle that they have an interest in purchasing. Search results are displayed, including detail information of vehicles identified in the search 1506. Displayed or presented on the vehicle detail page is an indicator of the number of leads that have been generated by the vehicle 1506. The dealer can choose to purchase leads when purchasing the vehicle 1508. Alternatively, the dealer can purchase the leads separately without purchasing the vehicle.

The WVIRLGS of an embodiment, as described above, includes filters for filtering wholesale vehicle inventory in order to customize inventory presented to a dealer and/or a consumer. The filtering can be applied automatically and/or manually using pre-specified criteria. In an embodiment, the filtering is applied by the provider so that the dealer is presented with a subset of the wholesale inventory that has been filtered to meet criteria that correspond to the dealer. In an alternative embodiment, the dealer receives unfiltered wholesale inventory from the provider, and the filtering is applied by the dealer so that the consumer is presented a subset of the wholesale inventory that was received by the dealer. In another alternative embodiment, filtering is applied by both the provider and the dealer, such that the dealer is presented with a first subset of wholesale inventory that has been filtered by the provider to meet criteria that correspond to the dealer, and the dealer subsequently can filter the received wholesale inventory to present a second subset of the wholesale inventory to the retail consumer.

Regardless of whether filtering is applied by the provider and/or the dealer, it is performed using criteria defined by the provider and/or the dealer. Filtering can be based on any criteria as specified by the provider and/or the dealer. The criteria of an embodiment includes, but is not limited to one or more of vehicle year range, selection of vehicle make, selection of vehicle model, vehicle type (luxury vehicle, compact vehicle, truck, sport utility vehicle (SUV), etc.), vehicle mileage range, vehicle price range, and proximity of vehicle location to dealer.

As described above, the WVIRLGS of an embodiment presents the dealer with an electronic interface for acquiring an item from wholesale inventory, where the item corresponds to a lead received from a potential retail consumer. The electronic interface for acquiring the item can be an interface for purchasing the item or bidding on the item. The electronic interface for bidding on the item can include an interface of or link to a system comprising a bidding tool for electronic or online auctions. An example follows of an online auction system for use in bidding on the item, but the embodiment is not so limited. The item of the following auction system example is a vehicle, but the embodiment is not limited to a vehicle and can include any type, number, or combination of items. In the example system described below, the buyer corresponds to the dealer of the above-described embodiments of the WVIRLGS, and the seller corresponds to any third-party auctioning items in a wholesale market.

Figure 16:
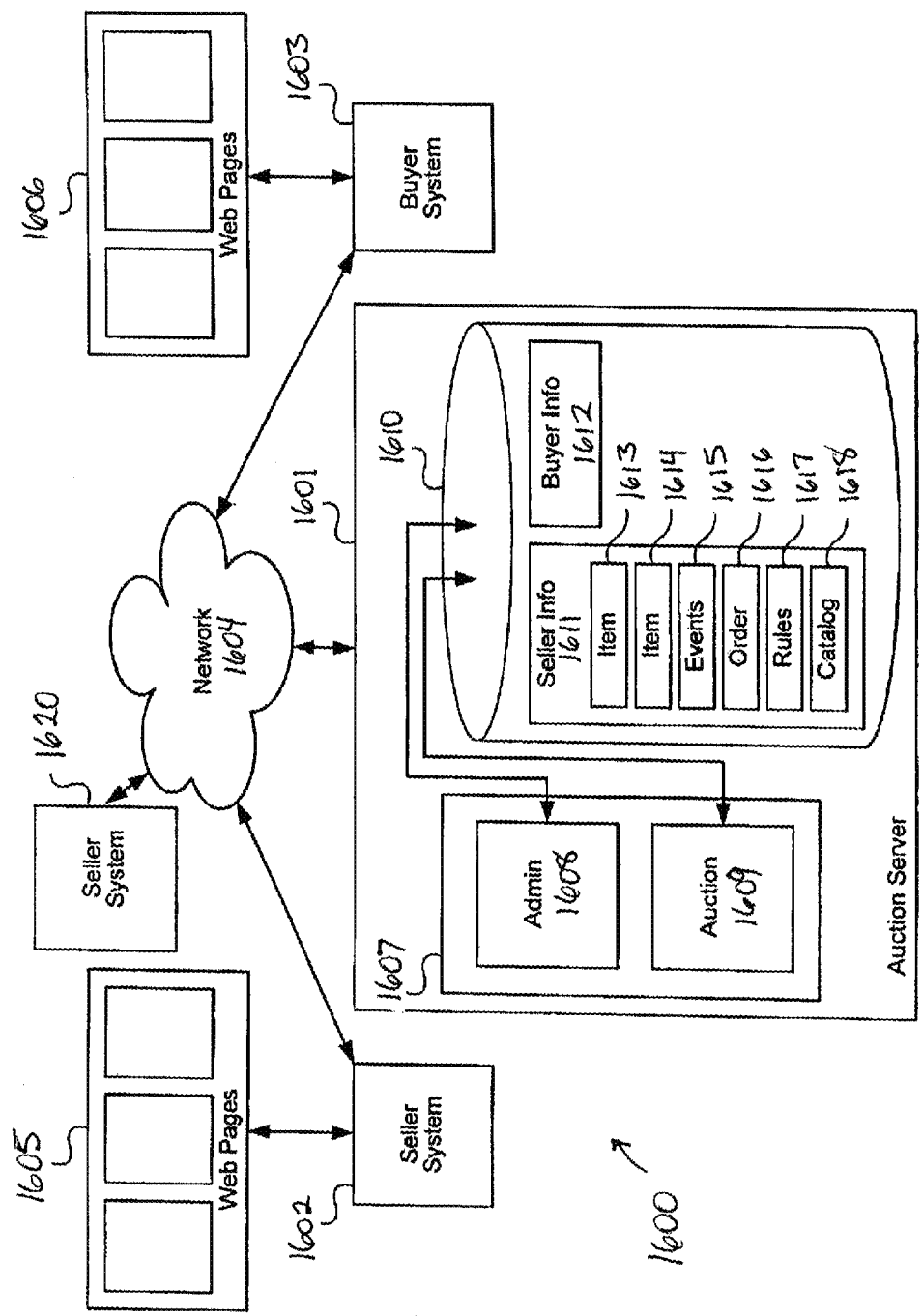
FIG. 16 is a block diagram of a system with a bidding tool, under an embodiment.

FIG. 16 is a block diagram of a system 1600 with a bidding tool, under an embodiment. Other tools and network configurations may be used according to other embodiments of the invention. The system shown includes an auction server 1601, seller system 1602, seller system 1620, and buyer system 1603. Also shown is network 1604. Seller system 1602 includes web pages 1605, and buyer system 1603 includes web pages 1606. Auction server 1601 includes software 1607 and storage 1610. Software 1607 includes administrative software 1608 and auction software 1609, and storage includes seller information 1611 and buyer information 1612. Seller information 1611 includes information such as vehicle information 1613 and 1614, and events information 1615 which includes order 1616, rules 1617 and catalog 1618. Auction server 1601 is coupled to seller system 1602 and buyer system 1603 via network 1604. Software 1607 in auction server 1601 operates with storage 1610.

Seller system 1602 includes functionality to manage inventory (such as vehicles), set up and modify bidding events, and manage bidding events. Such functionality may be included directly in seller system 1602 or may be included in auction server 1601 or in a combination of software or other logic located in seller system 1602 and auction server 1601.

Buyer system 1603 includes functionality to view catalog items for bidding, to place bids and view an auction, and to select purchase, payment and delivery options for items purchased. This functionality may be included in functionality on buyer system 1603, auction server 1601 and/or combination of functionality located on auction server 1601 and buyer system 1603. The functionality may be implemented in software, hardware, or a combination of hardware and software according to various embodiments. Thus, according to various embodiments, the implementations described herein for software may also be implemented in various configurations of software and/or hardware, in distributed or other configurations in various machines and/or networks.

Auction server 1601 includes software and storage to manage options and the users of the auctions. Administrative software 1608 manages users and information related to users, such as seller information 1611 and buyer information 1612. Auction software 1609 controls an auction including the progress of the auction as requested by seller system 1602 and response to bids made by buyer system 1603.

Seller system 1602 includes web pages 1605 that allow seller to enter and display information regarding auction events, inventory, and related administration. Buyer system 1603 includes web pages 1606 that allow a buyer to display information regarding bidding as well as enter information commands in order to participate in bidding in auctions.

Figure 17:
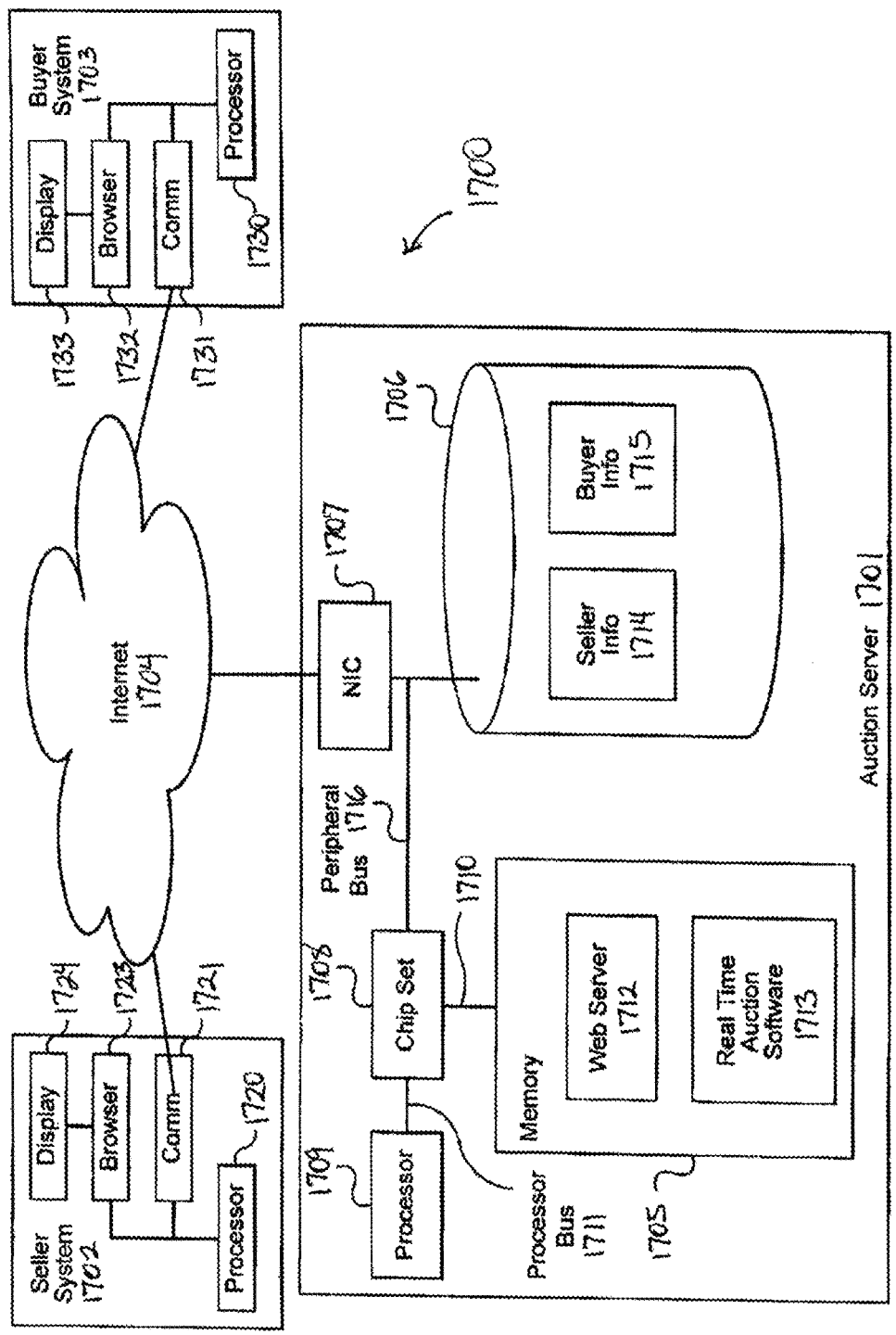
FIG. 17 is a more detailed block diagram of a system with a bidding tool, under an embodiment.

FIG. 17 is a more detailed block diagram of a system with a bidding tool, under an embodiment. Other tools and network configurations may be used according to other embodiments of the invention. In the system 1700 shown are auction server 1701, seller system 1702, and buyer system 1703. Auction server 1701 is coupled to seller system 1702 and buyer system 1703 through Internet 1704. Auction server 1701 may include a processor 1709 for processing instructions. Processor 1709 is coupled to chip set 1708 by a processor bus 1711. Chip set 1708 is coupled to memory 1705 by a memory bus 1710 and manages access to memory 1705 by processor 1709. Chip set 1708 is also coupled to peripheral bus 1716. Peripheral 1716 bus can comprise, for example, PCI, PCI-X, PCI Express, or other peripheral bus. Auction server 1701 also includes one or more network interface cards 1707 coupled to peripheral bus 1716 for providing network interfaces to network, such as Internet 1704. Storage 1706, such as a disk array or other non-voltage storage, is also coupled to peripheral bus 1716.

According to various embodiments, memory 1705 and/or storage 1706 may include various forms of storage or computer-readable memories such as, but not limited to, volatile memory (random access memory ("RAM"), non-volatile memory (read-only memory ("ROM")), EEPROM, disk, and/or other storage devices that may include one or more of magnetic, optical storage, or other media. The memory and/or storage on the auction server may be configured as a RAID (Redundant Array of Independent Disks) configuration to provide high reliability access to software and data.

Software may be loaded into memory 1705 to help provide auction/bidding function for auction server 1701. For example, web server 1712 and real-time auction software 1713 may be loaded into memory 1705 and run by processor 1709. Web server 1712 provides web pages for the users to interact with in order to be provided with auctions/bidding functions. For example, web server 1712 may serve up web pages to seller system 1702 and buyer system 1703 in order to allow seller system 1702 to manage inventory events and bidding and to allow buyer system 1703 to view events and auction items to make bids and to participate in auctions. Storage 1706 includes information about respective users, such as seller information 1714 and buyer information 1715. This information is used in order to manage the inventory of items for sale, configuration of bidding events, and the processing of real-time bidding. According to various embodiments of the invention, auction system 1700 may include one or a plurality of auction servers 1701 in various configurations and architectures to provide auctions and bidding functionality.

Seller system 1702 and/or buyer system 1703 may comprise computer systems coupled to a network such as Internet 1704 according to an embodiment. As shown, seller system 1702 includes processor 1720 and software components such as a browser 1723 and communications software 1721. Also included is a display 1724 that allows a user to see information regarding auctions and to perform related administration. Buyer system 1703 also includes a processor 1730, communication software 1731, browser 1732, and display 1733. Various browser software or other software or functionality to provide user interaction may be used in buyer and seller systems. For example, browsers may include, but are not limited to, Internet Explorer, Netscape browser, Firefox browser, Safari browser or other browser. Alternatively, other user interface software not including a browser may be used.

Software such as web server 1712 and real-time auction software 1713 may be stored in storage 1706 or other storage and may be loaded into memory 1705 for manipulation by processor 1709 according to an embodiment of the invention. Portions of data such as seller information 1714 and buyer information 1715 may be loaded into data structures in memory 1705 or other storage for manipulation by processor 1709 in accordance with software such as web server 1712 and real-time auction software 1713. Web server 1712 includes an operating system for managing system resources, as well as applications software running on top of the operating systems for implementing an HTML server or other server. Information stored in storage 1706 may be stored in various forms of database arrangements and may contain cross references or links to one another to allow information to be queried and retrieved. In an example embodiment, the information is stored in databases, such as relational databases, and may be queried using structured query language (SQL) or other mechanism.

The system may include a secure connection or connections. For example, in an embodiment of the invention, the entire bidding operation of the system operates on a secure connection or connections. Various different technologies may be used to provide a secure connection, such as encryption with, for example, public key and private key encryption. The system may be set up over a virtual private network (VPN).

In an example embodiment, a seller operates seller system 1702 through browser 1723, communications software 1721, and display 1724 to set up seller inventory and seller events in seller information storage 1714. The seller-user also manages the events and bidding through seller system 1702, which communicates via Internet 1704 with web server 1712.

Buyer system 1703 interacts with a buyer user, allowing the buyer user to view items and events including the items for auction. The interaction is provided to the buyer user through display 1733, browser 1732, and communications software 1731, which are controlled by processor 1730. Buyer system in turn communicates with auction server 1701 via Internet 1704. Web server 1712 in turn provides buyer system 1703 with graphical interface pages which may be displayed on display 1733.

Embodiments described herein include a system comprising: a platform comprising a processor and a database that includes a plurality of items and data of the plurality of items, wherein the plurality of items is in a wholesale market and is available for purchase only by a dealer in the wholesale market; a lead acquisition module (LAM) coupled to the platform; and a lead interface coupled to the LAM and displayed at a remote electronic site along with the plurality of items and data of the plurality of items, wherein the lead interface generates an electronic lead when selected by a retail consumer interested in purchasing an item of the plurality of items displayed at the remote electronic site, wherein the platform provides the dealer with information of the lead when the dealer has agreed to pay a fee for the lead and the dealer uses the information of the lead to consider purchasing the vehicle in the wholesale market for resale to the retail consumer.

The system of an embodiment comprises a wholesale automobile market module (WAMM) coupled to the platform, the WAMM comprising a wholesale inventory of the plurality of items available for purchase in the wholesale market.

The WAMM of an embodiment comprises a search interface for searching the wholesale inventory. The WAMM of an embodiment comprises a viewing interface for viewing results of the searching and the data of the wholesale inventory.

The WAMM of an embodiment comprises an interface for use only by the dealer for at least one of purchasing and bidding on an item of the wholesale inventory.

The lead of an embodiment comprises identification information of the item and identification and contact information corresponding to the retail consumer.

The system of an embodiment comprises an electronic message generated in response to receipt of a lead, wherein the platform generates the electronic message and transmits the message to the dealer.

The lead of an embodiment is stored in the LAM.

The LAM of an embodiment comprises a search interface for searching leads that have been generated by retail consumers. The LAM of an embodiment comprises a viewing interface for viewing results of the searching and details of the leads.

The LAM of an embodiment comprises an interface for accessing contact information for any retail consumer corresponding to a lead.

The LAM of an embodiment comprises an interface for accessing purchase information for any item corresponding to a lead.

The LAM of an embodiment comprises an interface for managing payment for a lead.

The LAM of an embodiment comprises an interface for accessing and managing leads corresponding to a dealer.

The remote electronic site of an embodiment is retail website coupled to the platform and the database.

The remote electronic site of an embodiment is a retail website independent of the platform.

The remote electronic site of an embodiment receives information of the database via a periodic data feed from the platform, wherein the plurality of items and data of the plurality of items are displayed from the information received via the data feed.

The remote electronic site of an embodiment comprises an inventory module received from the platform and integrated into the remote electronic site, wherein the plurality of items and data of the plurality of items are displayed from the inventory module.

The remote electronic site of an embodiment is a retail website of the dealer, wherein the inventory module generates the leads corresponding to the plurality of items in the inventory module to the dealer.

The remote electronic site of an embodiment comprises a search interface for searching the plurality of items. The remote electronic site of an embodiment comprises a viewing interface for viewing results of the searching and the data of the plurality of items.

The dealer of an embodiment has agreed to pay a fee for the lead that is a subscription fee.

The dealer of an embodiment has agreed to pay a fee for the lead that is paid per lead acquired by the dealer.

The dealer of an embodiment has agreed to pay a fee for the lead that is paid per lead generated by the retail consumer.

The system of an embodiment comprises a filter coupled to the platform, the filter executing to filter the plurality of items and the data of the plurality of items using at least one criteria, wherein the criteria comprises year range, make, model, type, mileage range, price range, and proximity of item to at least one of the dealer and the retail consumer.

Embodiments described herein include a system comprising: a platform coupled to a network, the platform comprising a processor and a database that comprises a plurality of items and data of the plurality of items, wherein the plurality of items is in a wholesale market and owned by a third party, and is available for purchase only by dealers in the wholesale market; an electronic site coupled to the network, wherein the electronic site presents the plurality of items and data of the plurality of items to a plurality of retail consumers; a lead interface displayed at the electronic site, wherein the lead interface generates a lead when selected by a potential retail consumer interested in purchasing an item of the plurality of items presented at the electronic site, wherein the lead is an electronic message, and the plurality of retail consumers comprises the potential retail consumer; a lead acquisition module (LAM) coupled to the platform, wherein the LAM receives the lead from the lead interface; at least one of a portal of the platform that provides a dealer with electronic access to the lead and an electronic message generated by the platform to notify the dealer of the lead, wherein the dealers in the wholesale market comprise the dealer and the dealer has agreed to pay a fee for the lead, wherein the lead allows the dealer to consider purchasing the vehicle in the wholesale market for resale to the potential retail consumer in a retail market.

Embodiments described herein include a system comprising a processor and a database that includes a plurality of items and data of the plurality of items, wherein the plurality of items is in a wholesale market and is available for purchase only by a dealer in the wholesale market, wherein the processor presents an item and data of the item to a retail consumer, wherein the item is available for purchase only by a dealer in the wholesale market, wherein the processor receives an electronic lead from the retail consumer interested in purchasing the item, wherein the processor provides the dealer with electronic access to the lead in exchange for a fee received from the dealer for the lead, wherein the dealer uses the lead to at least one of identify and contact the retail consumer and consider purchasing the vehicle in the wholesale market for resale to the retail consumer.

Embodiments described herein include a method comprising: presenting an item and data of the item to a retail consumer, wherein the presenting is via an electronic site, wherein the item is in a wholesale market and is owned by a third party, wherein the item is available for purchase only by a dealer in the wholesale market; receiving a lead from the retail consumer interested in purchasing the item, wherein the lead is an electronic message generated at the electronic site; and providing the dealer with electronic access to the lead in exchange for a fee received from the dealer for the lead, wherein the dealer uses the lead to consider purchasing the vehicle in the wholesale market for resale to the retail consumer.

The method of an embodiment comprises providing the dealer with electronic access to a wholesale inventory including a plurality of items available for purchase in the wholesale market, wherein the plurality of items comprise the item and the data of the item.

The method of an embodiment comprises presenting to the dealer a search interface for searching the wholesale inventory, and a viewing interface for viewing results of the searching and the data of the wholesale inventory.

The method of an embodiment comprises presenting to the dealer an interface for use only by the dealer for at least one of purchasing and bidding on the item in the wholesale inventory.

The lead of an embodiment comprises identification information of the item and identification and contact information corresponding to the retail consumer.

The method of an embodiment comprises generating an electronic message in response to receipt of the lead, and transmitting the electronic message to the dealer.

The method of an embodiment comprises storing the lead.

The method of an embodiment comprises presenting to the dealer a search interface for searching leads that have been generated by retail consumers, and a viewing interface for viewing results of the searching and details of the leads.

The method of an embodiment comprises presenting to the dealer an interface for accessing identification and contact information for any retail consumer corresponding to a lead.

The method of an embodiment comprises presenting to the dealer an interface for accessing purchase information for an item corresponding to a lead.

The method of an embodiment comprises presenting to the dealer an interface for managing payment for a lead.

The method of an embodiment comprises presenting to the dealer an interface for accessing and managing leads corresponding to a dealer.

The remote site of an embodiment is a retail website.

The method of an embodiment comprises transferring via a data feed to the electronic site a plurality of items and data of the plurality of items, wherein the plurality of items and data of the plurality of items comprise the item and data of the item.

The method of an embodiment comprises transferring an inventory module to the electronic site and integrating the inventory module into the remote electronic site, the inventory module including a plurality of items and data of the plurality of items, wherein the plurality of items and data of the plurality of items comprise the item and data of the item, wherein the item and data of the item is displayed from the inventory module.

The electronic site of an embodiment is a retail website of the dealer, wherein the inventory module generates the leads corresponding to the plurality of items in the inventory module to the dealer.

The method of an embodiment comprises presenting via the remote electronic site a search interface for searching the plurality of items, and a viewing interface for viewing results of the searching and the data of the plurality of items.

The method of an embodiment comprises presenting a filter interface to at least one of a provider of the item and the dealer, the filter interface controlling filtering of the plurality of items and the data of the plurality of items using at least one criteria, wherein the criteria comprises year range, make, model, type, mileage range, price range, and proximity of item to at least one of the dealer and the retail consumer.

The fee of an embodiment is a subscription fee.

The fee of an embodiment is a fee per lead acquired.

The fee of an embodiment is a fee per lead generated.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments is not intended to be exhaustive or to limit the systems and methods described to the precise form disclosed. While specific embodiments and examples are described herein for illustrative purposes, various equivalent modifications are possible within the scope of other systems and methods, as those skilled in the relevant art will recognize. The teachings provided herein can be applied to other processing systems and methods, not only for the systems and methods described above.

The elements and acts of the various embodiments described above can be combined to provide further embodiments. These and other changes can be made to the embodiments in light of the above detailed description.

In general, in the following claims, the terms used should not be construed to limit the embodiments described herein and corresponding systems and methods to the specific embodiments disclosed in the specification and the claims, but should be construed to include all systems and methods that operate under the claims. Accordingly, the embodiments described herein are not limited by the disclosure, but instead the scope is to be determined entirely by the claims.

While certain aspects of the embodiments described herein are presented below in certain claim forms, the inventors contemplate the various aspects of the embodiments and corresponding systems and methods in any number of claim forms. Accordingly, the inventors reserve the right to add additional claims after filing the application to pursue such additional claim forms for other aspects of the embodiments described herein and corresponding systems and methods.

The invention claimed is:

1. A vehicle distribution system comprising:
   a database comprising data regarding vehicles for purchase;
   a software module embedded in a dealer website associated with a dealer, the dealer website accessible via a dealer website address; and
   a vehicle distribution computer system,
   wherein searches via the software module are routed to the vehicle distribution computer system;
   wherein the vehicle distribution system, including the vehicle distribution computer system, is independent of the dealer;
   wherein the dealer website is independent of the vehicle distribution computer system;
   wherein the vehicle distribution computer system is configured to:
      receive a vehicle search request, the vehicle search request previously submitted by a consumer that visits the dealer website address of the dealer website and submits the vehicle search request via the software module;
      generate a filtered set of vehicles from the data in the database according to one or more vehicle filtering criteria set by the vehicle distribution computer system or the dealer, wherein the one or more vehicle filtering criteria are selected to customize the filtered set of vehicles to be a subset of the data in the database according to at least one aspect of the dealer;
      return to the consumer via the software module the filtered set of vehicles;
      receive, via the software module, an indication of interest from the consumer in at least one vehicle in the filtered set of vehicles;
      store the indication of interest from the consumer in at least one vehicle in the filtered set of vehicles; and
      transmit to the dealer the indication of interest from the consumer in at least one vehicle.

2. The vehicle distribution system of claim 1, wherein the one or more vehicle filtering criteria comprises proximity of vehicle location to the dealer.

3. The vehicle distribution system of claim 1, wherein the one or more vehicle filtering criteria comprises a predetermined geographic area; and
   wherein the predetermined geographic area is associated with the dealer.

4. The vehicle distribution system of claim 3, wherein the data regarding the vehicles for purchase are associated with a respective geographic area; and
   wherein the vehicle distribution computer system is configured to generate the filtered set of vehicles based on the predetermined geographic area associated with the dealer and the respective geographic area of the vehicles for purchase.

5. The vehicle distribution system of claim 1, wherein the one or more vehicle filtering criteria comprises vehicle make and vehicle model.

6. The vehicle distribution system of claim 1, wherein the software module comprises a portlet embedded in the dealer website.

7. The vehicle distribution system of claim 6, wherein the portlet is embedded in the dealer website by:
   sending a code to the dealer; and
   sending instructions to the dealer to incorporate the portlet into the dealer website.

8. The vehicle distribution system of claim 6, wherein the vehicle distribution computer system is configured, via the portlet, to:
   generate a search interface configured to receive search criteria input via the consumer;
   receive the search criteria input by the consumer;
   generate the filtered set of vehicles according to the one or more vehicle filtering criteria and the search criteria input by the consumer; and
   generate a viewing search results interface comprising the filtered set of vehicles.

9. The vehicle distribution system of claim 8, wherein the one or more vehicle filtering criteria are selected by the vehicle distribution computer system.

10. The vehicle distribution system of claim 8, wherein the one or more vehicle filtering criteria are selected by the dealer.

11. The vehicle distribution system of claim 8, wherein the vehicle distribution computer system is configured, via the portlet, to: responsive to generating the viewing search results interface, receive the indication of interest from the consumer in at least one vehicle in the filtered set of vehicles.

12. The vehicle distribution system of claim 1, wherein the vehicle distribution computer system is configured to transmit the indication of interest to the dealer responsive to the dealer logging into the vehicle distribution computer system.

13. The vehicle distribution system of claim 12, wherein the vehicle distribution computer system includes a vehicle distribution computer system website; and
   wherein the vehicle distribution computer system is configured to transmit the indication of interest to the dealer responsive to the dealer logging into the vehicle distribution computer system website.

14. The vehicle distribution system of claim 1, wherein the vehicle distribution system is configured to transmit to the dealer the indication of interest from the consumer in at least one vehicle via an electronic communication separate from the dealer website.

15. The vehicle distribution system of claim 1, wherein the one or more vehicle filtering criteria are selected by the vehicle distribution computer system and the dealer.

16. A method using a vehicle distribution system, the vehicle distribution system including a database comprising data regarding vehicles for purchase, a software module embedded in a dealer website associated with a dealer, and a vehicle distribution computer system, the method comprising:

receiving a vehicle search request, the vehicle search request being routed to the vehicle distribution computer system from the software module embedded in the dealer website associated with the dealer, wherein the dealer web site is accessible via a dealer website address, wherein the vehicle search request was previously submitted by a consumer that visits the dealer website address of the dealer website and submits the vehicle search request via the software module, and wherein the vehicle distribution system, including the vehicle distribution computer system, is independent of the dealer;

generating a filtered set of vehicles from the data in the database according to one or more vehicle filtering criteria set by the vehicle distribution computer system or the dealer, wherein the one or more vehicle filtering criteria are selected to customize the filtered set of vehicles to be a subset of the data in the database according to at least one aspect of the dealer;

returning to the consumer via the software module the filtered set of vehicles;

receiving, via the software module, an indication of interest from the consumer in at least one vehicle in the filtered set of vehicles; and storing the indication of interest from the consumer in the at least one vehicle in the filtered set of vehicles.

17. The method of claim 16, further comprising:
transmitting to the dealer the indication of interest from the consumer in the at least one vehicle via an electronic communication separate from the dealer website.

18. The method of claim 16, wherein the one or more vehicle filtering criteria comprises a predetermined geographic area;
wherein the predetermined geographic area is associated with the dealer;
wherein the data regarding the vehicles for purchase are associated with a respective geographic area; and
wherein generating the filtered set of vehicles is based on the predetermined geographic area associated with the dealer and the respective geographic area of the vehicles for purchase.

19. The method of claim 16, wherein the software module comprises a portlet embedded in the dealer website; and
wherein the portlet is embedded in the dealer website by:
sending a code to the dealer; and
sending instructions to the dealer to incorporate the portlet into the dealer website.

20. The method of claim 16, wherein the vehicle distribution computer system:
generates a search interface configured to receive search criteria input via the consumer;
receives the search criteria input by the consumer;
generates the filtered set of vehicles according to the one or more vehicle filtering criteria and the search criteria input by the consumer; and
generates a viewing search results interface comprising the filtered set of vehicles.

21. The method of claim 16, wherein the vehicle distribution computer system transmits the indication of interest to the dealer responsive to the dealer logging into the vehicle distribution computer system.

22. The method of claim 21, wherein the vehicle distribution computer system includes a vehicle distribution computer system website; and wherein the vehicle distribution computer system transmits the indication of interest to the dealer responsive to the dealer logging into the vehicle distribution computer system website.

23. An item distribution system comprising:
a database comprising data regarding items for purchase;
a software module embedded in a dealer website associated with a dealer, the dealer website accessible via a dealer website address; and
an item distribution computer system,
wherein searches via the software module are routed to the item distribution computer system;
wherein the item distribution system, including the item distribution computer system, is independent of the dealer;
wherein the dealer website is independent of the item distribution computer system;
wherein the item distribution computer system is configured to:
receive an item search request, the item search request previously submitted by a consumer that visits the dealer website address of the dealer website and submits the item search request via the software module;
generate a filtered set of items from the data in the database according to one or more item filtering criteria set by the item distribution computer system or the dealer, wherein the one or more item filtering criteria are selected to customize the filtered set of items to be a subset of the data in the database according to at least one aspect of the dealer;
return to the consumer via the software module the filtered set of items;
receive, via the software module, an indication of interest from the consumer in at least one item in the filtered set of items;
store the indication of interest from the consumer in at least one item in the filtered set of items; and
transmit to the dealer the indication of interest from the consumer in at least one item.

24. The item distribution system of claim 23, wherein the item distribution computer system is configured to transmit the indication of interest to the dealer responsive to the dealer logging into an item distribution computer system website, the item distribution computer system website associated with the item distribution computer system.

25. A method using an item distribution system, the item distribution system including a database comprising data regarding items for purchase, a software module embedded in a dealer web site associated with a dealer, and an item distribution computer system, the method comprising:
receiving an item search request, the item search request being routed to the item distribution computer system from the software module embedded in the dealer website associated with the dealer, wherein the dealer web site is accessible via a dealer website address, wherein the item search request was previously submitted by a consumer that visits the dealer website address of the dealer website and submits the item search request via the software module, and wherein the item distribution system, including the item distribution computer system, is independent of the dealer;
generating a filtered set of items from the data in the database according to one or more item filtering criteria set by the item distribution computer system or the dealer, wherein the one or more item filtering criteria are selected to customize the filtered set of items to be a subset of the data in the database according to at least one aspect of the dealer;

returning to the consumer via the software module the filtered set of items;

receiving, via the software module, an indication of interest from the consumer in at least one item in the filtered set of items; and storing the indication of interest from the consumer in the at least one item in the filtered set of items.

26. The method of claim 25, further comprising:

transmitting to the dealer the indication of interest from the consumer in the at least one item via an electronic communication separate from the dealer website.

* * * * *